United States Patent
Chun et al.

(10) Patent No.: US 10,345,924 B2
(45) Date of Patent: Jul. 9, 2019

(54) METHOD FOR UTILIZING SENSOR AND ELECTRONIC DEVICE IMPLEMENTING SAME

(71) Applicant: Samsung Electronics Co., Ltd., Gyeonggi-do (KR)

(72) Inventors: Jae-Bong Chun, Gyeonggi-do (KR); Dong-Il Son, Gyeonggi-do (KR); Chi-Hyun Cho, Gyeonggi-do (KR); Gyu-Cheol Choi, Gyeonggi-do (KR); Chang-Ryong Heo, Gyeonggi-do (KR); Chang-Taek Kang, Gyeonggi-do (KR); Changsoo Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 247 days.

(21) Appl. No.: 15/359,799

(22) Filed: Nov. 23, 2016

(65) Prior Publication Data
US 2017/0205897 A1    Jul. 20, 2017

(30) Foreign Application Priority Data
Jan. 20, 2016    (KR) .................. 10-2016-0006772

(51) Int. Cl.
G06F 3/03      (2006.01)
G06K 9/00      (2006.01)
G06F 3/01      (2006.01)
G06F 3/038     (2013.01)

(52) U.S. Cl.
CPC ............... *G06F 3/03* (2013.01); *G06F 3/012* (2013.01); *G06F 3/017* (2013.01); *G06F 3/0304* (2013.01); *G06F 3/038* (2013.01); *G06K 9/0057* (2013.01); *G06K 9/00664* (2013.01); *G06K 9/00771* (2013.01)

(58) Field of Classification Search
CPC .... G06F 3/03; G06K 9/0057; G06K 9/00664; G06K 9/00771
See application file for complete search history.

(56) References Cited

U.S. PATENT DOCUMENTS

| | | | |
|---|---|---|---|
| 8,775,337 B2 | 7/2014 | Bahl et al. | |
| 2014/0191938 A1* | 7/2014 | Ybanez Zepeda | G06F 3/017 345/156 |
| 2015/0127300 A1* | 5/2015 | Bluming | G01D 21/02 702/189 |
| 2015/0165895 A1* | 6/2015 | Menor | B60K 7/0007 701/23 |

(Continued)

*Primary Examiner* — Viet D Pham
(74) *Attorney, Agent, or Firm* — Cha + Reiter, LLC.

(57) ABSTRACT

A method and apparatus for an electronic device and sensor includes: a housing; at least one sensor disposed on a part of the housing to detect an external image of the electronic device or sound. A communication circuit cis arranged in the housing, and at least one processor is electrically connected to the at least one sensor and the communication circuit. A memory stores instructions that, when executed, cause the at least one processor to control operation of the at least one sensor to operate as a user interface of the electronic device, and/or to operate as a sensing device for detecting a movement and/or sound of an object within a selected range or space, and to provide data based at least partly on the detected movement and/or sound.

10 Claims, 24 Drawing Sheets

(56) References Cited

U.S. PATENT DOCUMENTS

2015/0355811 A1* 12/2015 Ybanez Zepeda ...... G06F 3/017
715/810
2016/0124707 A1* 5/2016 Ermilov .................. G06F 9/451
345/156

* cited by examiner

METHOD FOR UTILIZING SENSOR AND ELECTRONIC DEVICE IMPLEMENTING SAME

CLAIM OF PRIORITY

This application claims the priority under 35 U.S.C. § 119(a) from Korean Application Serial No. 10-2016-0006772, which was filed in the Korean Intellectual Property Office on Jan. 20, 2016, the entire content of which is hereby incorporated by reference.

BACKGROUND

Field of the Disclosure

Various embodiments relate to a method for utilizing a sensor and an electronic device implementing the same.

Description of the Related Art

Recently, with the development of digital technology, various types of electronic devices such as a mobile communication terminal, a Personal Digital Assistant (PDA), an electronic scheduler, a smart phone, a tablet Personal Computer (PC), a wearable device, and the like have come into widespread use. The electronic devices are provided with various functions such as a voice call, a message transmission such as a Short Message Service (SMS)/a Multimedia Message Service (MMS), a video call, an electronic scheduler, e-mail transmission and reception, broadcast reproduction, Internet access, music reproduction, schedule management, a social network service (SNS), a messenger service, a dictionary, and a game, just to name a few possible examples.

Meanwhile, the electronic device may store in a memory image data that was collected using a camera device or an optical sensor. The electronic device may detect an object or a person by comparing an image collected by the camera with the stored image data. For example, the electronic device may detect that a person is included in the image data by identifying the face of a person included in the image data. When the presence of a person is detected using a camera device, a process of the camera device is not changed and a process of data processing performed by the electronic device increases.

When additional functions (e.g., detecting the presence of a person) as well as a main function (e.g., facial recognition and recording monitoring, etc.) are performed using a conventional sensor (e.g., camera devices), the electronic device should perform an additional process of data processing as well as a process of the conventional sensor. In this case, the electronic device processes the additional functions as a one-time event form. For example, even though the camera device has a function of detecting the presence of a person using an additional function, the electronic device may determine the camera device as only an image processing sensor and recognize the camera device as an occupancy sensor (presence sensor). In addition, the camera device may sense the conventional area on which the camera device can move so as to have a restriction on the range of recognition. In addition, when trying to detect the presence of a person, the camera device should perform all of the main functions and then further process data, however the camera device may also detect whether or not a person is present. Therefore, overhead for the data processing may increase.

SUMMARY

Various embodiments of the disclosure may utilize one sensor as comprising two or more sensors, by registering additional functions to a virtual sensor other than an original function of the one sensor.

An electronic device according to various embodiments of the disclosure includes: a housing; a communication circuit disposed in the housing; at least one sensor disposed on a part of the housing and configured to detect an external image of the electronic device or a sound thereof; at least one processor disposed in the housing and electrically connected to the at least one sensor and the communication circuit; and a memory disposed in the housing and electrically connected to the at least one processor, wherein the memory stores instructions that, when executed, cause the at least one processor to: cause the at least one sensor to operate as a user interface of the electronic device; cause the at least one sensor to operate as a sensing device for detecting a movement and/or sound of an object within a selected range or space from the electronic device, and to provide data based at least partly on the detected movement and/or sound; and communicate at least a portion of the data with an external device, using the communication circuit, and/or process the at least a portion of the data internally.

In addition, according to an embodiment of the present disclosure, an electronic device comprises a housing; a communication circuit disposed in the housing; at least one sensor arranged on the housing and configured to detect an external image of the electronic device or sound thereof; at least one processor disposed in the housing and electrically connected to the at least one sensor and the communication circuit; and a memory disposed in the housing and electrically connected to the at least one processor, wherein the memory stores instructions that, when executed by the at least one processor, configures the at least one processor to: control the at least one sensor to operate as a user interface of the electronic device; and control the at least one sensor to operate as a sensing device that detects at least one of a movement or a sound of an object within a selected range or space from the electronic device, and to provide data based at least in part on the detected movement and/or sound; and perform at least one of transmitting at least a portion of the data based at least in part on the detected movement and/or sound to an external device via the communication circuit, or process the at least a portion of the data internally.

An method for operating an electronic device according to various embodiments of the present disclosure includes: driving at least one sensor provided as a user interface of the electronic device; driving the at least one sensor provided as a sensing device for detecting the movement or sound of an object in a selected range or space to provide data based on at least some of the detected movement or sound; transmitting at least a portion of data to an external device by utilizing a communication circuit; and internally processing the at least a portion of data.

A computer-readable recording medium according to various embodiments of the present disclosure may store a program for executing operations by hardware such as at least one processor or microprocessor, the operations including: driving the at least one sensor provided as a user interface of the electronic device; driving the at least one sensor provided as a sensing device for detecting the movement or sound of an object in a selected range or space to provide data based on at least some of the detected movement or sound; transmitting at least a portion of data to an external device by using the communication circuit; and internally processing said at least a portion of data.

According to various embodiments of the present disclosure, one sensor may be utilized as two or more sensors, by registering additional functions other than a main function of one sensor to a virtual sensor.

According to various embodiments of the present disclosure, when using a position-based sensor, a lot of sensors fixedly installed at several locations are required, however a movable driver may be included in a single sensor so as to move the single sensor to a desired location to perform functions.

According to various embodiments of the present disclosure, the present disclosure may analyze functions of a sensor to perform some of the functions of the sensor, or reduce processing steps of the sensor so as to operate the sensor with less power.

BRIEF DESCRIPTION OF THE DRAWINGS

The above and other aspects, features, and advantages of the present disclosure will become better appreciated by a person of ordinary skill in the art from the following detailed description taken in conjunction with the accompanying drawings, in which.

DETAILED DESCRIPTION

Figure 1:
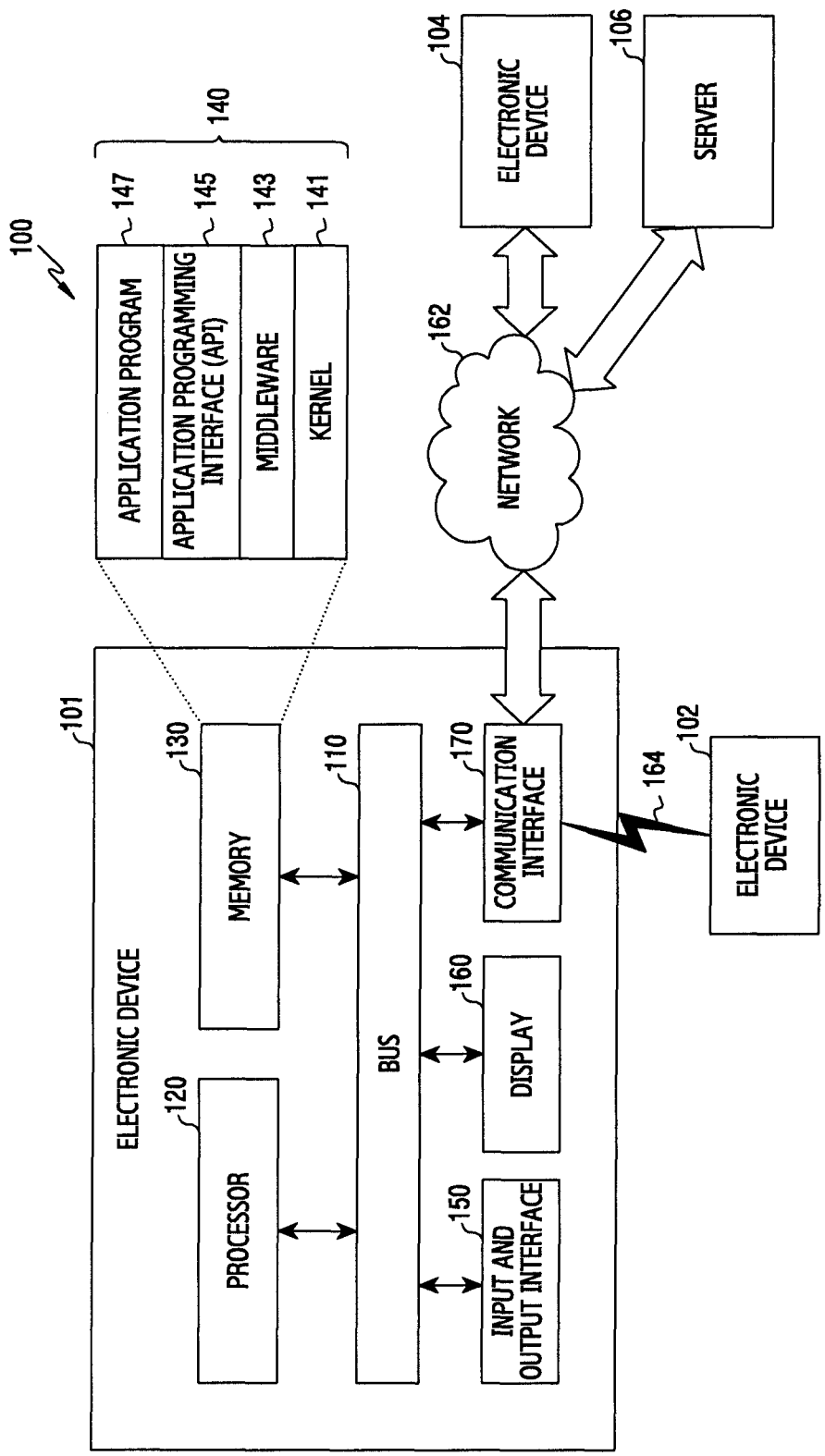
FIG. 1 is a diagram illustrating an electronic device in a network environment according to various embodiments of the present disclosure.

Hereinafter, various embodiments of the present disclosure will now be described with reference to the accompanying drawings. However, it should be understood that the present disclosure is not limited to the particular forms disclosed herein; rather, the present disclosure should be construed to cover various modifications, equivalents, and/or alternatives of embodiments of the present disclosure and the appended claims. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B. The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no elements (e.g., third element) interposed between them.

The expression "configured to" used in the present disclosure may be exchanged with, for example, "suitable for", "designed to", "adapted to", "made to", according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and do not limit the present disclosure or the appended claims. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments of the present disclosure, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments of the present disclosure, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments of the present disclosure, will be described with reference to FIG. 1. The electronic device 101 may include a bus 110, a at least one processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The at least one processor 120 may include one or more of a Central Processing Unit (CPU), an Application Processor (AP), and a Communication Processor (CP). The at least one processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the at least one processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the at least one processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network. The communication interface 170 includes hardware such as an antenna, transmitter, receiver, or transceiver for wireless or wired communication.

Each of the first and second external electronic devices 102 and 104 may be of a type identical to or different from that of the electronic device 101. According to an embodiment of the present disclosure, the server 106 may include a group of one or more servers.

According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
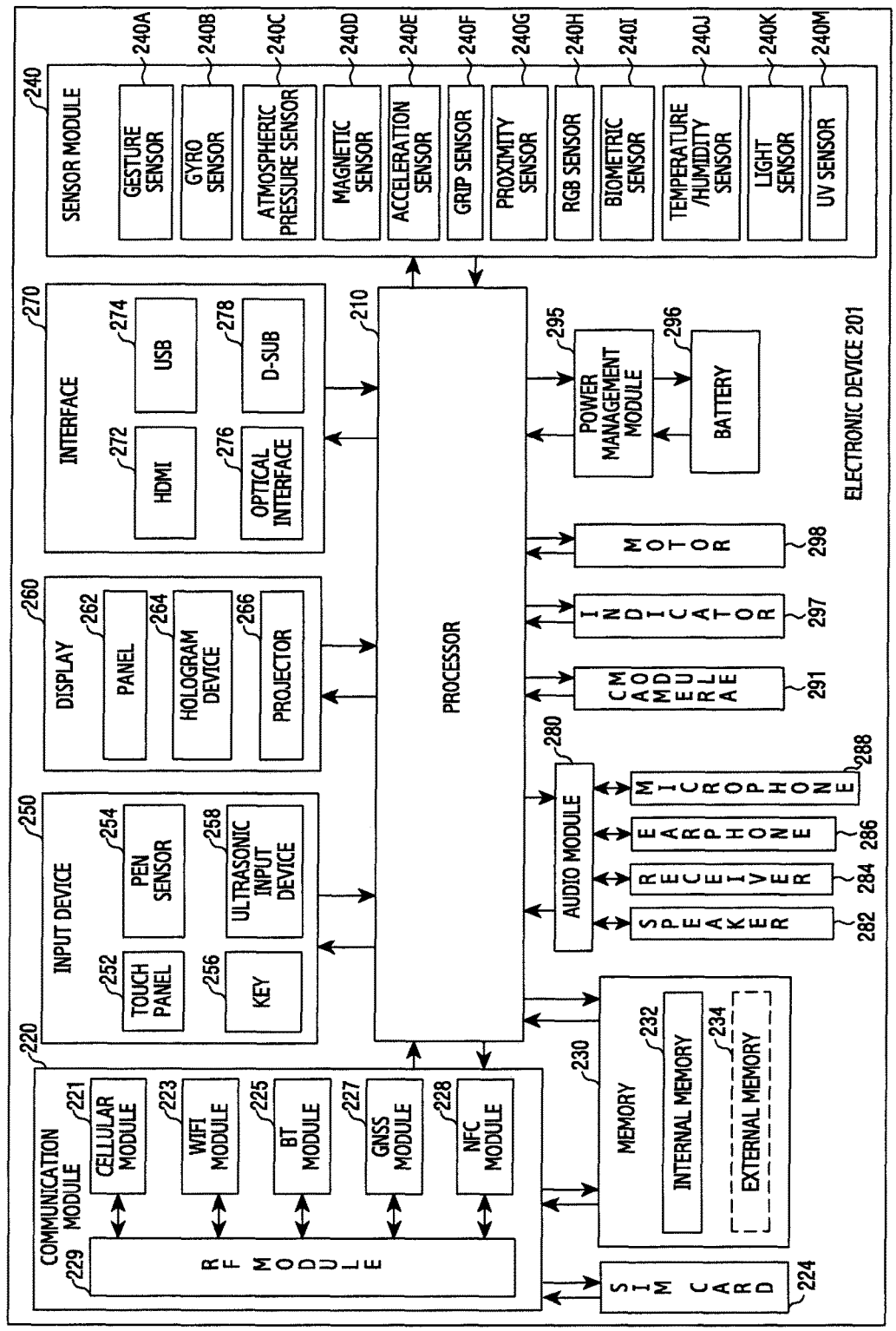
FIG. 2 is a block diagram illustrating a configuration of an electronic device according to various embodiments of the present disclosure.

FIG. 2 is a block diagram of an electronic device according to various embodiments of the present disclosure.

The electronic device 201 may include, for example, all or a part of the electronic device 101 shown in FIG. 1. The electronic device 201 may include at least one processor 210 (e.g., Application Processors (AP)), a communication module 220, a non-transitory memory 230, a sensor module 240, an input device 250, a display 260, an interface 270, an audio module 280, a camera module 291, a power management module 295, a battery 296, an indicator 297, and a motor 298.

The at least one processor 210 may control a plurality of hardware components and associated software operatively connected to the at least one processor 210 by driving an operating system or an application program, and perform processing of various portions of data and calculations. The at least one processor 210 may be embodied as, for example, a System on Chip (SoC). According to an embodiment of the present disclosure, the at least one processor 210 may further include a Graphic Processing Unit (GPU) and/or an image signal processor. The at least one processor 210 may include at least some (e.g., a cellular module 221) of the components illustrated in FIG. 2. The at least one processor 210 may load, into a volatile memory, commands or data received from at least one (e.g., a non-volatile memory) of the other components and may process the loaded commands or data, and may store various data in a non-volatile memory.

The communication module 220 includes hardware and may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a subscriber identification module (e.g: SIM card) 224 (e.g., the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor having circuitry configured for processing data transmitted/received through a corresponding module and an encoder/decoder. According to an embodiment of the present disclosure, at least some (e.g., two or more) of the cellular module 221, the Wi-Fi module 223, the BT module 225, the GNSS module 227, and the NFC module 228 may be included in one Integrated Chip (IC), or an IC package.

The RF module 229, for example, may transmit/receive a communication signal (e.g., an RF signal). The RF module 229 may include, for example, hardware such as a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, comprises hardware that may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M, just to name some non-limiting examples. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the at least one processor 210 or separately from the at least one processor 210, and may control the sensor module 240 while the at least one processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device including hardware which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the at least one processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, a media data according to a certain standard such as Digital Multimedia Broadcasting (DMB), Digital Video Broadcasting (DVB), or media-FLO™.

Each of the above-described component elements of hardware according to the present disclosure may be configured with one or more components, and the names of the corresponding component elements may vary based on the type of electronic device. In various embodiments of the present disclosure, the electronic device may include at least one of the above-described elements. Some of the above-described elements may be omitted from the electronic device, or the electronic device may further include additional elements. Also, some of the hardware components according to various embodiments of the present disclosure may be combined into one entity, which may perform functions identical to those of the relevant components before the combination.

Figure 3:
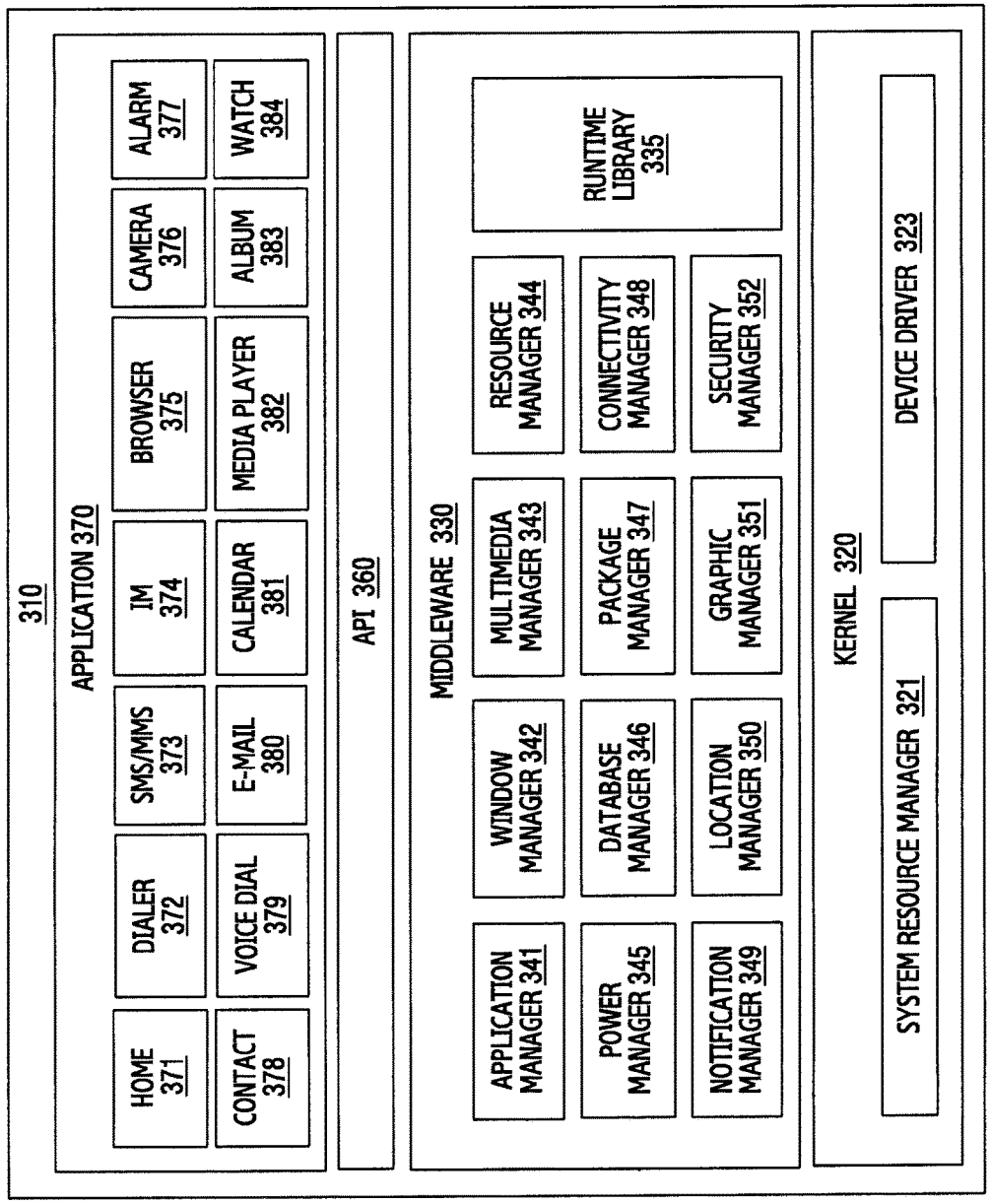
FIG. 3 is a block diagram of a program module according to various embodiments of the present disclosure.

FIG. 3 is a block diagram of a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like, and is executed by hardware.

The program module 310 may include, for example, a kernel 320, middleware 330, an API 360, and/or applications 370. At least some of the program module 310 may be preloaded on an electronic device, or may be downloaded from an external electronic device (e.g., the electronic device 102 or 104, or the server 106) for execution by hardware such as a processor.

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments of the present disclosure, at least a part of the programming module 310 may be implemented in software, firmware, hardware, or a combination of two or more thereof. At least some of the program module 310 may be implemented (e.g., executed) by, for example, the at least one processor (e.g., the at least one processor 210). At least some of the program module 310 may include, for example, a module, a program, a routine, a set of instructions, and/or a process for performing one or more functions.

The term "module" as used herein may, for example, mean a unit including one of hardware, software and/or firmware in conjunction with hardware or a combination thereof. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, at least some of the devices (e.g., modules or functions thereof) or the method (e.g., operations) according to the present disclosure may be implemented by a command stored in a computer-readable storage medium in a programming module form. The instruction, when executed by a at least one processor (e.g., the at least one processor 120), may cause the at least one processor to execute the function corresponding to the instruction. The computer-readable recoding media may be, for example, the memory 130.

Figure 4:
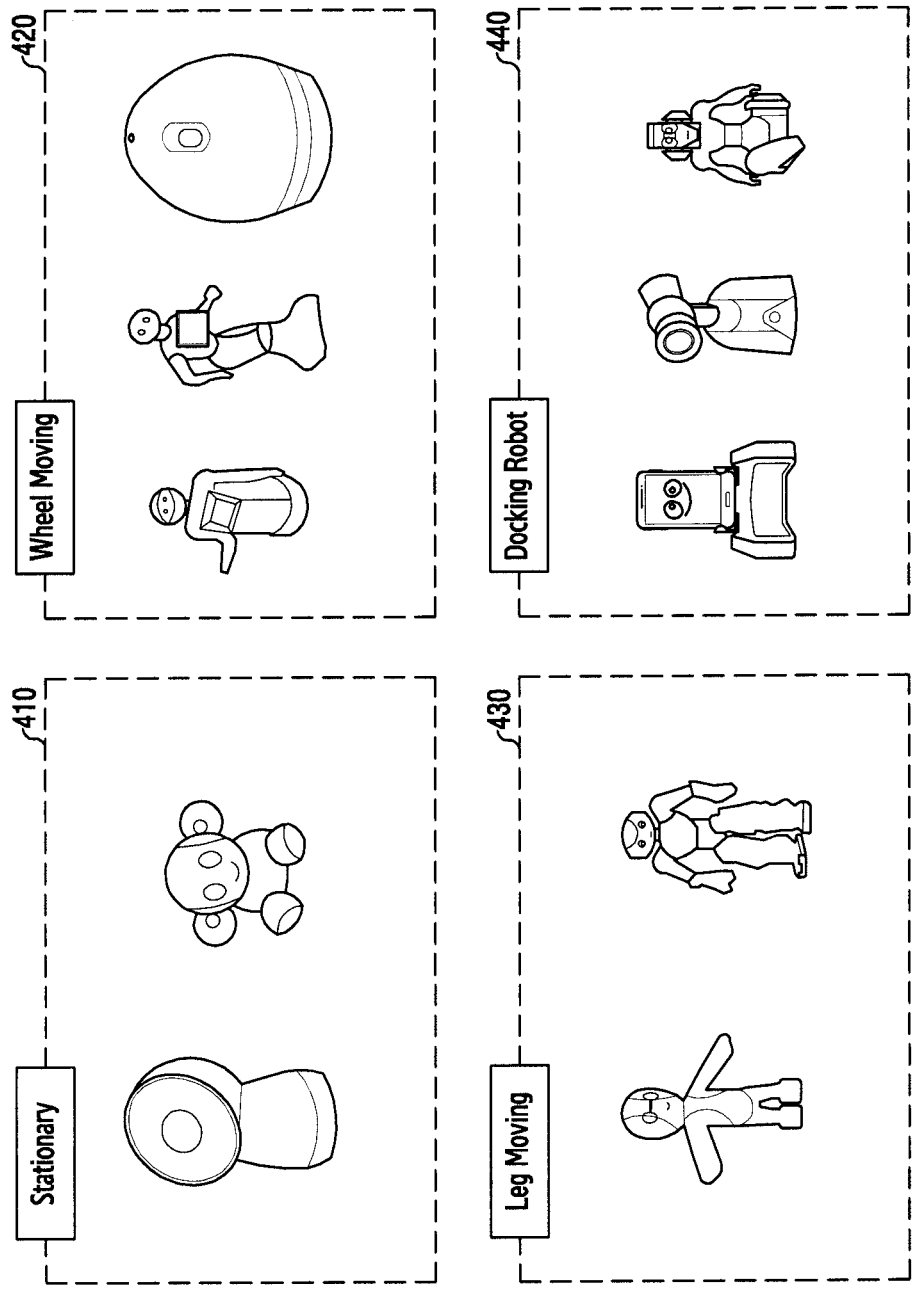
FIG. 4 is a block diagram illustrating various types of electronic devices according to various embodiments of the present disclosure.

FIG. 4 is a block diagram illustrating various types of electronic devices according to various embodiments of the present disclosure.

Referring now to FIG. 4, electronic devices may be divided into a fixed type and portable type according to whether the electronic device is movable. For example, the fixed type may include a stationary type 410 and a docking robot 440. The stationary type 410 may include a home gateway, remote controlled conversation, and the like. The electronic device (e.g., a smart phone and a tablet PC) is mounted on the docking robot 440, and the docking robot 440 may include, for example, an autonomous mobile robot, a music reproduction dancing robot, a remote controlled face configuration robot. The portable type may include a wheel moving type 420, a leg moving type 430, a caterpillar type, and a flying type (e.g., drone). The wheel moving type 420 is provided with a wheel by which a robot may move. The leg moving type 430 is provided with movable legs by which a robot may move. The caterpillar type may connect multiple pieces of metal to each other, like a belt and use the metal as wheels. The flying type may be an aircraft such as a drone or a helicopter shaped flying vehicle.

Figure 5:
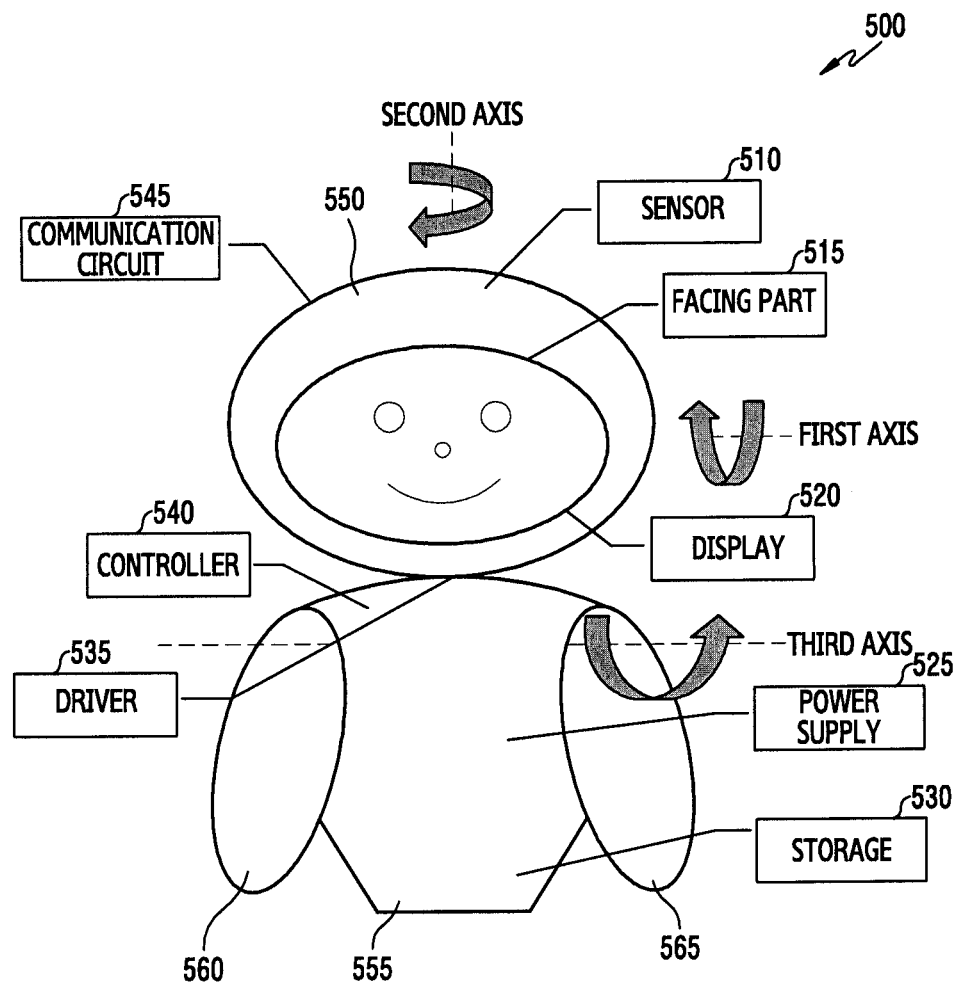
FIG. 5 is a block diagram illustrating an external appearance of an electronic device according to various embodiments of the present disclosure.

FIG. 5 is a block diagram illustrating an external appearance of an electronic device according to various embodiments of the present disclosure. Referring now to FIG. 5, an electronic device 500 may include a sensor 510, a face part 515, a display 520, a power supply 525, a storage 530, and a driver 535, a controller 540, and a communication circuit 545. Elements of the electronic device 500 are similar to or the same as the elements of the electronic device of FIGS. 1 and 2 described above, and the detailed description thereof will be omitted.

According to various embodiments of the present disclosure, the electronic device 500 may be a sculpture similar to the appearance of a person and include a head part 550, a body 555, and arms 560 and 565. The head part 550 may move back and forth with reference to a first axis. Further, the head part 550 may move left and right with reference to a second axis. The arms 560 and 565 may move up and down with reference to a third axis.

The sensor 510 may measure a physical quantity or sense an operational state of the electronic device 500 and may convert the measured or sensed information into an electrical signal. The sensor 510 may include at least one of an image sensor, a microphone, an ultra-wide band sensor, or a Wi-Fi circuit. For example, the sensor 510 may be similar to a sensor 240 of FIG. 2. In FIG. 5, the sensor 510 is disposed on the head part 550 of the electronic device 500, however the sensor 510 may be disposed on the body 555 or arms 560 and 565.

The face part 515 may represent an area in which the electronic device interacts with a user. For example, the face part 515 may represent eyes, a nose, and a mouth to look like a human face shape. Alternatively, the face part 515 may display a direction or indicate lights. To this end, the face part 515 may include an image sensor for sensing an image, a microphone for acquiring a voice, and the display 520 for outputting a screen image. The face part 515 may be disposed on the head part 550.

The display 520 may be included in the face part 515 and display a person's face image, a direction, and lights. For example, the display unit 520 may be the display 160 of FIG. 1 and the display 260 of FIG. 2.

The power supply 525 may provide power to the electronic device 500 and manage the power of the electronic device 500. For example, the power supply 525 may be the power management module 295 and a battery 296 of FIG. 2. Referring now to FIG. 5, the power supply 525 is illustrated as being disposed on the body 555, however the power supply 525 may be disposed on the head part 550 or the arms 560 and 565.

The storage 530 may store data sensed by the sensor 510 or store commands or data related to at least one other element of the electronic device 500. For example, the storage unit may be the memory 130 of FIG. 1 and the memory 230 of FIG. 2. In FIG. 5, the storage 30 is illustrated as being disposed on the body 555, however the storage 530 may be disposed on the head part 550 or the arms 560 and 565.

The driver 535 may be used for moving the electronic device 500 and mechanically changing a position of other elements (e.g., the head part 550, body 555, and arms 560 and 565). The driver 535 may have a shape which can be moved up and down or left and right with reference to one or more axes (e.g., a first axis to a third axis) and the shape may be variously implemented.

The controller 540, which includes hardware such as a processor or microprocessor configured for operation, may process the driving and service providing of the electronic device 500. For example, the controller 540 may include at least one of an Application Processor (AP), a Communication Processor (CP), a Graphics Processor (GP), a Multi-Chip Package (MCP), and an Image Processor (IP). The controller 540 may be the at least one processor 120 of FIG. 1 or the at least one processor 210 or FIG. 2. In FIG. 5, the controller 540 is illustrated as being disposed on the body 555, however the controller 540 may be disposed on the head part 550 or the arms 560 and 565.

The communication circuit 545 may be connected to a network through wireless or wired communication to communicate with an external device (e.g., the second external electronic device 104 or server 106). The communication circuit 545 may be the communication interface 170 of FIG. 1 or the communication module 220 or FIG. 2. In FIG. 5, the communication circuit 545 is illustrated as being disposed on the body 555, however the communication circuit 545 may be disposed on the head part 550 or the arms 560 and 565.

Figure 6:
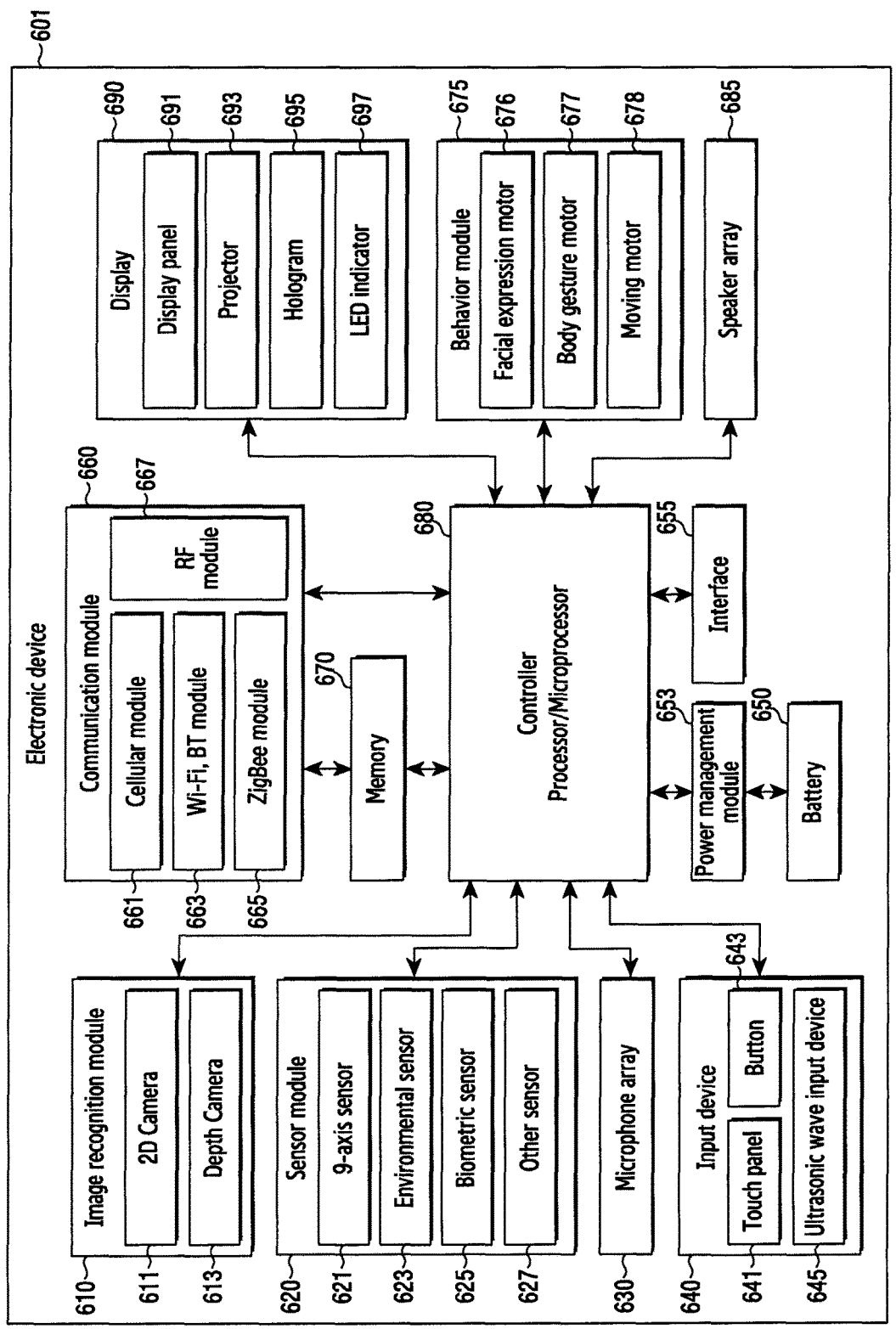
FIG. 6 is a block diagram illustrating a hardware configuration of an electronic device according to various embodiments of the present disclosure.

FIG. 6 is a block diagram illustrating a hardware configuration of an electronic device according to various embodiments of the present disclosure.

Referring now to FIG. 6, the electronic device 601 may include an image recognition module 610, a sensor 620, a microphone array 630, an input device 640, a power management controller 653, a battery 650, an interface 655, a communication module 660, a display 690, a behavior module 675, and a speaker array 685. In addition, according to various embodiments of the present disclosure, the electronic device 601 may further include a Subscriber Identification Module (SIM) card. Elements of the electronic device 601 are similar to or the same as the elements of the electronic device of FIGS. 1 and 2 described above, and the detailed description thereof will be omitted.

The image recognition module 610 may be a device that photographs still and moving images. For example, the image recognition module 610 may include a 2D camera 611 and a depth camera 613. According to an embodiment, the image recognition module 610 may include one or more image sensors, lenses, and an image signal processor (ISP), or flash (e.g., an LED or xenon lamp, etc.). For example, the 2D camera 611 may photograph a two-dimensional image, and the depth camera 613 may photograph a three-dimensional image. The image recognition module 610 may be the same as or similar to the camera module 291 of FIG. 2.

The sensor 620 may measure a physical quantity or sense an operation state of the electronic device 601 to convert the measured or sensed information to an electrical signal. For example, the sensor 620 may include at least one of a 9-axis sensor 621, an environmental sensor 623, a biometric sensor 625, or another sensor 627. Although not shown, the sensor 620 may include at least one of an image sensor, a microphone, an ultra-wide band sensor, or a Wi-Fi circuit. For example, the 9-axis sensor 621 may include an acceleration sensor, a gyro sensor, a compass sensor, and the like. The environmental sensor 623 may include an illuminance sensor, a barometric pressure sensor, a temperature sensor, a humidity sensor, a gas sensor, and the like. The biometric sensor 625 may include a fingerprint sensor, an iris recognition sensor, a Heart Rate Monitor (HRM) sensor, an electroencephalogram (EEG) sensor, an electrocardiogram (ECG) sensor, an olfactory sensor, electromyography (EMG) sensor, an IR sensor, etc. The other sensor 627 may include a thermopile sensor, a grip sensor, a gesture sensor, etc. The sensor module 620 may be the same as or similar to the sensor module 240 of FIG. 2.

The microphone array 630 may process the input sound information. The speaker array 685 may process the output sound information. The microphone array 630 and speaker array 685 may be the same as or similar to the input/output interface 150 of FIG. 1 and the audio module 280 of FIG. 2.

The input device 640 may transfer a command or data input from a user or other external devices to other element (s) of the electronic device 601, or output the command or data received from the other element (s) of the electronic device 601 to the user or other external devices. For example, the input device 640 may include a touch panel 641, a button 643, or an ultrasonic wave input device 645. The input device 640 may be the same as or similar to the input/output interface 150 or FIG. 1 or the input device 250 of FIG. 2.

The power management controller 653 may manage power of the electronic device 601. According to an embodiment, the power management controller 653 may include a Power Management Integrated Circuit (PMIC), a charger Integrated Circuit (IC), or a battery or fuel gauge. The battery 650 may include a rechargeable battery and/or a solar cell. The interface 655 may include an HDMI, USB, an optical interface, or D-sub. The operation 655 may be the same as or similar to the interface 270 of FIG. 2.

The communication unit 660 may be connected to a network through wireless or wired communication to communicate with an external device (e.g., the second external electronic device 104 or the server 106). For example, the communication module 660 may include a cellular module 661, Wi-Fi, a BT module 663, a ZigBee module 665, and an RF module 667. The ZigBee module 665 may support the communication of Z-wave, ZigBee, Ant+, etc. In addition, the communication module 660 may perform wireless communication including at least one of Bluetooth low energy (BLE), Near Field Communication (NFC), Magnetic Secure Transmission, Radio Frequency (RF), or a Body Area Network (BAN). The communication module 660 may be the same as or similar to the communication interface 170 of FIG. 1 or the communication module 220 of FIG. 2.

The memory 670 may store data sensed by the sensor module 620 or store a command or data related to at least one other element of the electronic device 601. For example, the memory 670 may be the same as or similar to the memory 130 of FIG. 1 and the memory 230 of FIG. 2.

The controller 680 may process the driving and service providing of the electronic device 601. For example, the controller 680 may include at least one of an Application Processor (AP), a Communication Processor (CP), a Graphics Processor (GP), a Multi-Chip Package (MCP), and an Image Processor (IP). The controller 680 may be the same as or similar to the at least one processor 120 of FIG. 1 or the at least one processor 210 or FIG. 2.

The display 690 may display the data of text, images, videos, icons, and/or symbols. For example, the display 690 may include at least one of a display panel 691, a projector 693, a hologram 695, or a LED indicator 697. The display 690 may be the same as or similar to the at least one processor 160 of FIG. 1 or the at least one processor 260 or FIG. 2.

A behavior module 675 may serve to represent, as information to be feedback to a user, the movement, graphics (UI/UX), light, voice, sound, etc. of the electronic device 601. For example, the behavior module 675 may include at least one of a facial expression motor 676, a body gesture motor 677, or a moving motor 678. The facial expression motor 676 may control the movement of the head part (e.g., the head part 550 in FIG. 5) of the electronic device 601. A body gesture motor 677 may control the movement of arms (e.g., the arms 560 and 565 in FIG. 5) or legs of the electronic device 601. A moving motor 678 may control the movement of the body of the electronic device 601 (e.g., the body 555 in FIG. 5) of the electronic device 601.

Figure 7:
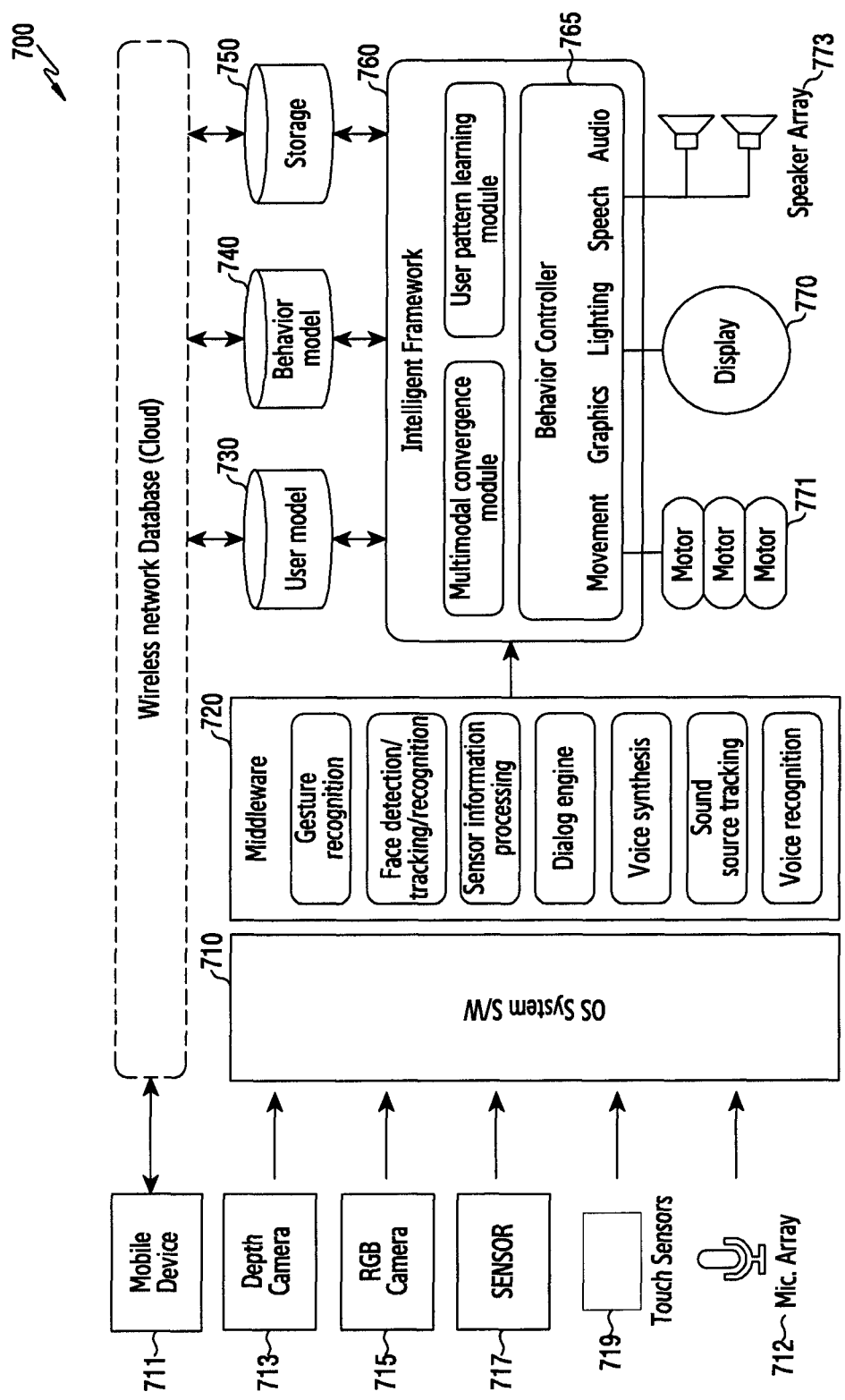
FIG. 7 is a block diagram illustrating a software configuration of an electronic device according to various embodiments of the present disclosure.

FIG. 7 is a block diagram illustrating a software configuration of an electronic device according to various embodiments of the present disclosure.

Referring now to FIG. 7, an electronic device 700 may include an operating system (OS) 710, middleware 720, or an intelligent framework 760.

The operating system 710 may play the role of a typical operating system, such as a resource allocation process and a job scheduling process of the electronic device 700. In addition, the operating system 710 may process signals input from a hardware device except for various hardware devices (e.g., a depth camera 713, a RGB camera 715, a sensor 717, touch sensors 719, and a microphone 712).

The middleware 720 may detect and track the position of a user's face using the signal processed data. In addition, the middleware 720 may process the gesture recognition, face detection, tracking, and recognition, the sensor information processing, dialog engine, voice synthesis, sound source tracking (e.g., DOA, Direct of Arrival), voice recognition, and signals of various sensor data.

An intelligent framework 760 may include a multimodal convergence module, a user pattern learning module, and a behavior controller 765. The multimodal convergence module may collect and manage various portions of information processed in the middleware 720. The user pattern learning module may extract and learn meaningful information such as the user's life pattern, preferences and the like using the multimodal convergence. The behavior controller 765 may control the electronic device 700 to represent information to be feedback to the user. For example, the behavior controller 765 may control the movement of the electronic device 700 (e.g., motor 771, graphics, lights (e.g., display 770), voice, sound (e.g., a speaker 773). For example, the behavior controller 765 may control the movement of the electronic device 700 (e.g., a motor 771, graphics, lights (e.g., a display 770)), voice, sound (e.g., a speaker 773).

In addition, the electronic device 700 may further include a user model DB 730 in which the information learned in the intelligent framework 760 is stored according to users, a behavior model DB 740 for controlling the behaviors of the electronic device 700, and a storage 750 for storing other portions of information. The user model DB 730, the behavior model DB 740, or the storage 750 may be stored in a wireless network database (e.g., cloud 770). Information stored in the wireless network DB 770 may be shared with other electronic device (e.g. the mobile device 711).

An electronic device described below permits an actual sensor to be also used as a virtual sensor for certain functions. Such electronic device may be the electronic device 101 illustrated in FIG. 1 or electronic device 201 illustrated in FIG. 2. In the following description, for the convenience of explanation, an electronic device is described as the electronic device 101 of FIG. 1, but the electronic device is not limited to the description thereof.

Figure 8:
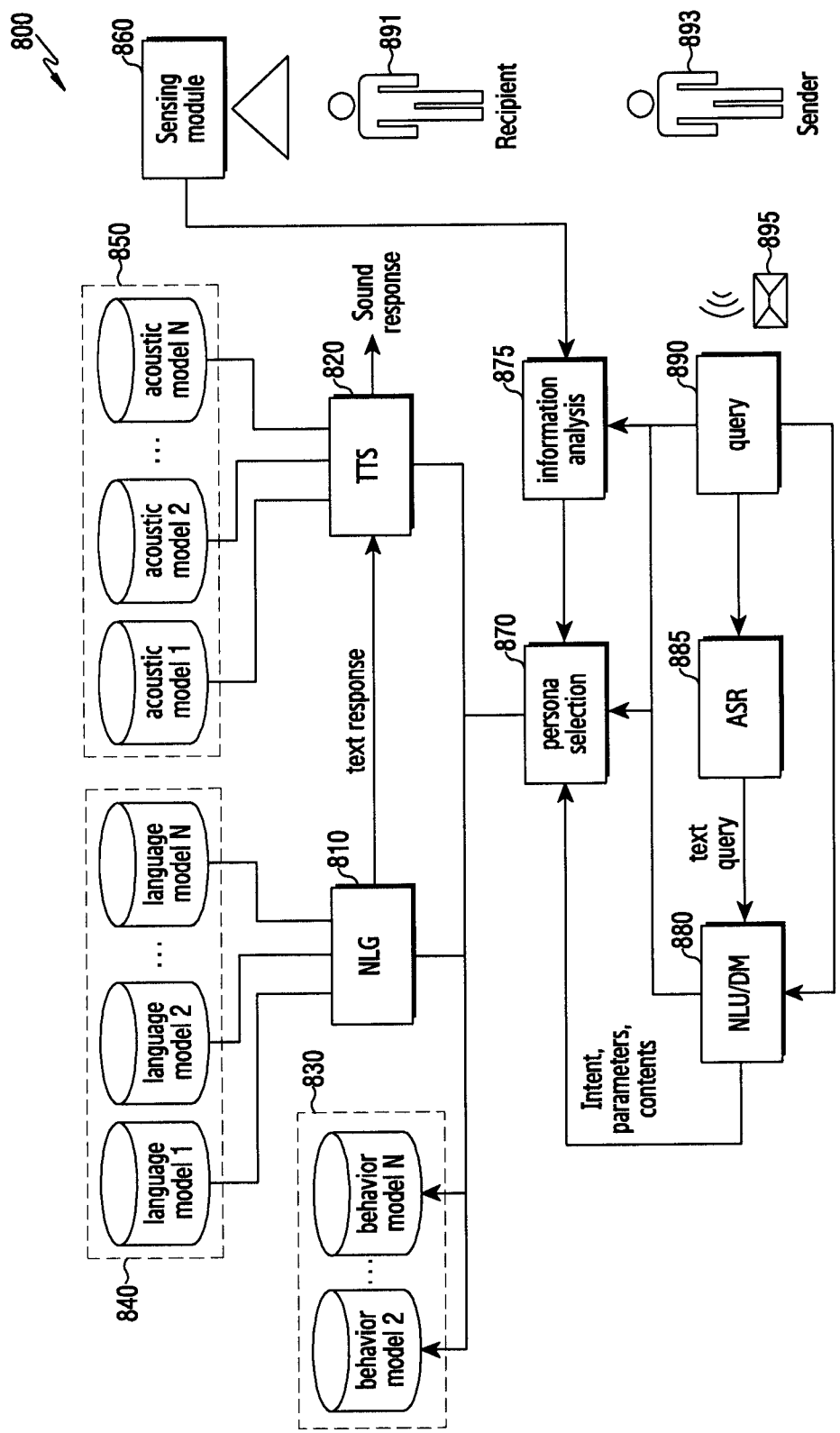
FIG. 8 illustrates a conceptual diagram illustrating voice recognition and output by an electronic device according to various embodiments of the present disclosure.

FIG. 8 illustrates a conceptual diagram 800 illustrating voice recognition and output by an electronic device according to various embodiments of the present disclosure.

Referring now to FIG. 8, the electronic device 101 may receive a message 895 from the sender 893. The electronic device 101 may query 890 the message 895 based on sound and perform acoustic speech recognition (ASR) 885. On the other hand, the electronic device 101 may query 890 the metadata of the message 895 and perform information analysis 875. In particular, the electronic device 101 may perform information analysis 875 through a sensing module 860 and determine a recipient 891 using the collected information. Further, the electronic device 101 may use information on the recipient 891 for persona selection 870.

The electronic device 101 may acquire text as a result of performing the acoustic speech recognition 885 and perform Natural Language Understanding (NLU) and Dialogue Management (DM) 880 using the acquired text as a query. The electronic device 101 may recognize the text as a sentence through the natural language understanding and dialog management 880. The electronic device 101 may utilize at least one of an intent, parameter, and content acquired through the natural language understanding and dialog management 880 for persona selection 870. The electronic device 101 may use the query 890 of the message 895 itself for the persona selection 870.

The electronic device 101 may select one of language models 840 through a Natural Language Generator (NLG) 810 based on the determined attribute (persona). For example, the language models 840 may include a language model 1 to a language model N. For example, the electronic device 101 may determine at least one text generation variable using the selected language model.

The electronic device 101 may select one of behavior models 830 based on the determined attribute. For example, the behavior models 830 may include a behavior model 1 to a behavior model N. For example, the electronic device 101 may determine at least one behavior variable using the selected behavior model.

The electronic device 101 may select one of acoustic models 850 based on the determined attribute. For example, the acoustic models 850 may include an acoustic model 1 to an acoustic model N. For example, the electronic device 101 may determine at least one voice generation variable, by which a text converted message is output through the NLG 810. The electronic device 101 may output a sound response according to the selected acoustic model. At this time, the electronic device 101 may perform speech synthesis (text-to-speech; TTS) 820 to output a voice response.

According to the above description, the electronic device 101 may provide a dynamic result to a user who interacts by changing the factor on the NLG and TTS modules according to the relationship between one or more entities or content to be delivered. In the process of persona selection 870, the electronic device 101 may use a sensor such as vision, sound, etc. for identifying at least one user and environment, connectivity, and personal profile data as well as the content of the message to be delivered. For the language model 840, different language models may be determined according to the recipient and the electronic device 101. For example, when the relationship of the recipient and the electronic device 101 is set as friends by a preset or learning, a language model for configuring words and phrases that represent the affinity may be selected. On the other hand, according to the message to be delivered to the user (e.g., the recipient 891) of the electronic device 101, an acoustic model having the characteristics of a quick and clear tone is selected so that words of an urgent message may be converted into language having the above characteristics. According to another embodiment, sound may be modulated by an acoustic model of a low-frequency band based on the information that the sound of a high frequency band is difficult to be heard by a recipient of the electronic device 101 and then the modulated sound can be output.

Figure 9:
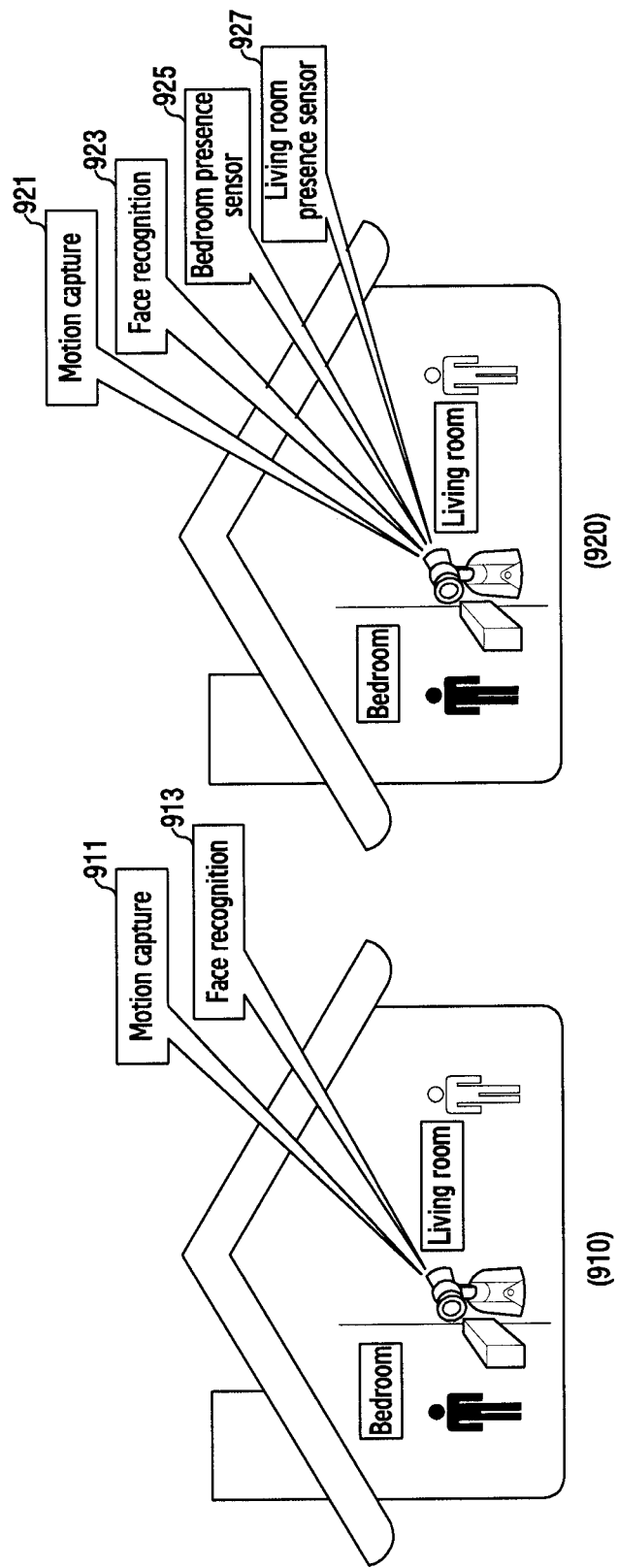
FIG. 9 is a diagram illustrating an example where a virtual sensor is being utilized according to various embodiments of the present disclosure.

FIG. 9 is a diagram illustrating an example where a virtual sensor is being utilized according to various embodiments of the present disclosure.

Referring now to FIG. 9, reference numeral "910" shows an example of using main functions of a sensor, and reference numeral "920" shows an example for utilizing additional functions as well as main functions of the sensor. For example, referring to reference number 910, when a camera device is installed in a bedroom or living room, a motion capture function 911 or face recognition function 913 may be performed using the camera device installed in the bedroom or living room. That is, the motion capture function 911 or the face recognition unit 913 is a main function of the camera device and corresponds to main functions of the camera device. In addition, the motion capture function 911 or face recognition function 913 may be performed at only one of location of the bedroom or living room at which the camera device is installed.

However, referring to reference number 920, when the camera device is installed in the bedroom or living room, the camera device may be utilized as a bedroom presence sensor 925 and a living room presence sensor 927 as well as the motion capture function 921 and face recognition function 923. According to various embodiments of the present disclosure, the camera device is equipped with a driving unit so that the electronic device 101 may move the camera device to the bedroom or living room and sense the motion or recognize the face of a person. In addition, the electronic device 101 may detect whether a person exists in the bedroom or living room based on data such as motion sensing or face recognition. That is, the electronic device 101 may utilize the camera device as a bedroom presence sensor 925 and a living room presence sensor 927 using data sensed by the camera device, as well as the motion capture function 921 and face recognition function 923.

An electronic device according to various embodiments of the present disclosure includes: a housing; at least one sensor disposed on a part of the housing and detect an external image of the electronic device or sound thereof; a communication circuit disposed in the housing; at least one processor disposed in the housing and electrically connected to the at least one sensor and communication circuit; and a memory disposed in the housing and electrically connected to the at least one processor, wherein the memory stores instructions that, when executed by at least one processor, configures the at least one processor to: control the at least one sensor to operate as a user interface of the electronic device; control the at least one sensor to operate as a sensing device for detecting a movement and/or sound of an object within a selected range or space, and to provide data based at least partly on the detected movement and/or sound; and communicate at least a portion of the data with an external device, using the communication circuit, and/or process at least a portion of the data internally.

The instructions may cause the process to make a determination that there has been a movement and/or sound of an object within a selected range or space; and provide a signal indicative of the determination to the external device, using the communication circuit.

The instructions may cause the process to cause the at least one sensor which is provided as a sensing device, during a selected period of time or when the selected condition is satisfied.

The at least one sensor may include at least one of an image sensor, a microphone, an ultra-wide band sensor, or a Wi-Fi circuit.

The electronic device may further include a driver connected to the housing to move the electronic device, and the memory may store instructions which control the driver to move or locate the electronic device to a selected viewpoint for detecting the movement or the sound of an object in the selected position or selected range or space.

The at least one processor may be configured to register the at least one sensor as a virtual sensor based on the position of the at least one sensor and add-on functions of the at least one sensor, process an event based on data sensed through the virtual sensor, and process a virtual event of the virtual sensor by using the processed event.

The at least one processor may be configured to extract information from a sensor which can be used as a virtual sensor of the at least one sensor, based on a rule, search for add-on functions of the extracted sensor, register the extracted sensor as a virtual sensor by using a retrieved add-on functions, and reset the rule to apply the rule to the at least one sensor and the virtual sensor.

When the registration position of the at least one sensor is different from the operating position thereof, the at least one processor may be configured to drive the driver to move the sensor to the operating position.

The at least one processor may be configured to receive feedback from the at least one sensor and determine a change in an operating mode of the at least one sensor based on the feedback.

The at least one processor may be configured to identify the processing of the at least one sensor based on the feedback, and when the processing of the at least one sensor and the processing of a virtual sensor associated with the at least one sensor are different from each other, change the operating mode of the at least one sensor.

Hereinafter, the electronic device 101 may refer to all devices, such as a smart phone, a sensor, a Hub, and a cloud in which a sensor can be registered and used.

Figure 10:
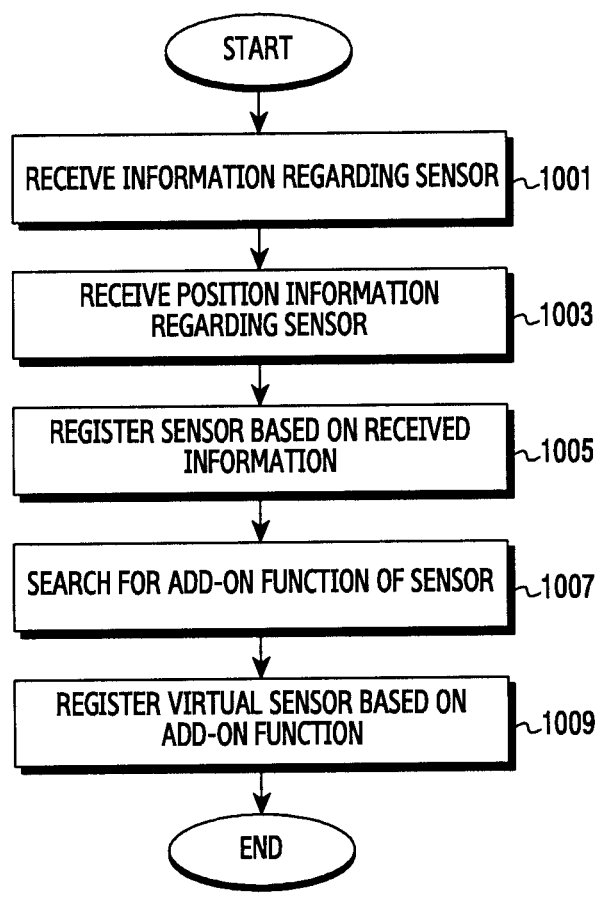
FIG. 10 is a flowchart illustrating a method for registering a virtual sensor according to various embodiments of the present disclosure.

FIG. 10 is a flowchart illustrating a method for registering a virtual sensor according to various embodiments of the present disclosure.

Referring now to FIG. 10 according to an embodiment of the present disclosure, in operation 1001, the electronic device 101 (e.g., the at least one processor 120) may receive information on a sensor. For example, the at least one processor 120 may provide a user interface for registering a sensor. The at least one processor 120 may receive information on the sensor from the user through the user interface. For example, the information on the sensor (e.g., identification information on the sensor) may include at least one of a sensor name (e.g., a model name of a sensor), a sensor identifier (e.g., a serial number of a sensor), a type of sensor (e.g., image, sound, etc.), or a manufacturer of a sensor. The user interface may include an input field for inputting each piece of information, or text which describes the information. When the user locates the cursor in the input field, the at least one processor 120 may display the keypad. On the other hand, the at least one processor 120 may provide a search page for an information search in order to correctly input information. For example, a user may input the model name of the desired sensor through the search page when the user does not know the exact model name of the sensor.

In operation 1003, according to an embodiment of the present disclosure, the at least one processor 120 may receive position information on the sensor. For example, the at least one processor 120 may provide a user interface for registering the position of a sensor. For example, a map, a latitude, and a longitude may be displayed in the user interface. On the other hand, when a sensor is registered in the home, the at least one processor 120 may provide a user interface including the position information, included in the home. For example, the user interface may include one of Room 1, Room 2, bathroom, kitchen, or living room as the position information. The user may select (or touch) one piece of position information from the user interface or directly input the desired position information to the user interface. The at least one processor 120 may perform the operation 1001 and the operation 1003 at the same time, or perform the operation 1003 and then perform the operation 1001.

In operation 1005, according to an embodiment of the present disclosure, the at least one processor 120 may register the sensor based on the received information. For example, the at least one processor 120 may register the sensor based on the information on the received sensor and position information thereof. The sensor registration may mean the registration of a main function of the sensor. The at least one processor 120 may register the sensor by storing information, position information, and a function of the sensor (e.g., a main function of the sensor) in the memory 130. For example, when the sensor is a camera device (for example: Closed Circuit Television (CCTV)), the at least one processor 120 may register the main function of the camera device with the information and position information of the camera device as motion recognition, face recognition, or event processing (e.g., when a motion is detected, the light is turned on).

In operation 1007, according to an embodiment of the present disclosure, the at least one processor 120 may search for add-on functions of the sensor. The add-on functions may refer functions which can be performed by the sensor other than the main function of the sensor. For example, the at least one processor 120 may search for add-on functions of the sensor using the information on the sensor. In other words, the at least one processor 120 may search for functions which can be performed by the sensor using a model name of the sensor, and search for add-on functions other than the main function among the retrieved functions. For example, when the sensor is a camera device and an image is primarily received from the camera device for the face recognition or motion detection and then secondarily processed, these may be considered as a single function of the camera sensor. Therefore, when the face recognition function and operation recognition function of the camera device are main functions of the camera device, it is possible to identify whether a person is in the room based on data sensed along therewith.

For example, the add-on function is to detect whether a user is in the room (e.g., presence). The camera device may primarily determine the presence or absence of a person, and determine whether one other person occupies a place. In addition, when the position of the recognized person is known, the camera device may additionally perform the role of a presence sensor based on the position of the person. Thus, it is possible to perform all the functions described above using one camera device without the need of installing presence sensors and camera devices in each room in the house.

In operation 1009, according to an embodiment of the present disclosure, the at least one processor 120 may register a virtual sensor based on the add-on function. The virtual sensor may refer to the actual sensor is being utilized as a different virtual sensor, not a physically installed sensor (e.g., an actual sensor) registered in the operation 1005. For example, when the actual sensor is a camera device, the at least one processor 120 may register the main function of the camera device as the actual sensor and register a virtual sensor as a sensor having an add-on function of the camera device. In other words, the motion detection or face recognition of the camera device is a main function of the actual sensor, and the presence function of the camera device may be a main function of the virtual sensor.

According to an embodiment of the present disclosure, the at least one processor 120 may register the virtual sensor by storing information on the virtual sensor, position information, and a function (e.g., an add-on function of the sensor) thereof in the memory 130. At this time, the information on the virtual sensor may be the same as the sensor information. On the other hand, the position information of the virtual sensor may be the same as or different from the position information of the sensor. In addition, the function of the virtual sensor may be different from the function of the sensor.

According to various embodiments of the present disclosure, the at least one processor 120 may register the virtual sensor based on the add-on function and the position. The position may be different from the position of the actual sensor. For example, when the actual sensor is set to the "living room", the virtual sensor may be set to "kitchen". The at least one processor 120 may set the position of the virtual sensor based on the add-on function. On the other hand, the at least one processor 120 may receive, from the user, the configuration of the position of the virtual sensor.

TABLE 1

| No. | Information | Type | Location | Function |
|---|---|---|---|---|
| ID 1 | EasyCAM ES100V | Camera | Living room | Motion detection, Face recognition |
| ID 2 | EasyCAM ES100V | Camera | Living room | Occupancy, Event processing (e.g., turn on the light) |
| ID 3 | EasyCAM ES100V | Camera | Kitchen | Occupancy |

According to an embodiment of the present disclosure, Table 1 may show the sensor information stored in the memory 130. Numbers are IDs assigned to the sensor, one ID (for example: ID 1, ID 2, ID 3 . . . ) may be assigned for each sensor. The information is information on the sensor, and for example, the information in Table 1 may be a model name of the sensor. The type may be a type of sensor, for example, a camera in Table 1. The position is a point in which a sensor can be detected, and for example, in Table 1, may be a living room or kitchen in home. The function may be a function of the sensor, and correspond to at least one of the various functions of the sensor. That is, the function may be a main function or add-on function of the sensor.

Table 1 shows an example of utilizing a single sensor as two virtual sensors. That is, referring to Table 1, three different IDs are assigned to the sensor, however it may be seen that the same information (information and type) is assigned thereto It can be seen that the first ID registers the main function of the camera device as the actual sensor, and the second and third IDs register the add-on function of the camera device as the virtual sensor, using a single camera device. The at least one processor 120 may register a virtual sensor (e.g., ID 2) at the same position from the actual sensor (e.g., ID 1) and register a virtual sensor (e.g., ID 3) having a different function and different position from the actual sensor. That is, the at least one processor 120 may register and use virtual sensors at different positions using a single camera device.

Figure 11:
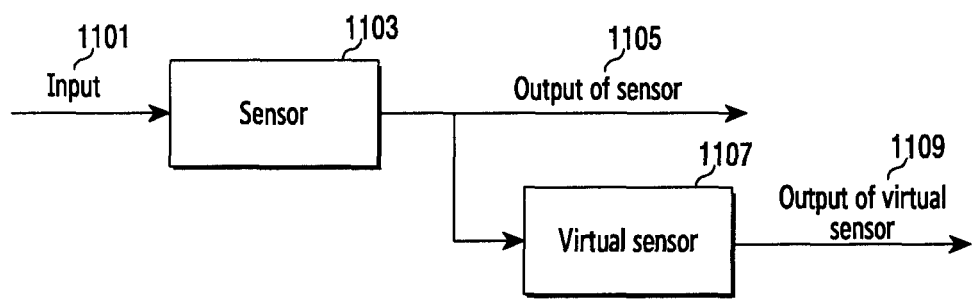
FIG. 11 is a diagram illustrating a configuration diagram of an actual sensor and virtual sensor according to various embodiments of the present disclosure.

FIG. 11 is a diagram illustrating a configuration diagram of an actual sensor and virtual sensor according to various embodiments of the present disclosure.

Referring now to FIG. 11, when an event is detected (e.g., operation sensing), the sensor 1103 may process the event as an input 1101. The sensor 1103 may process the input 1101 and output (indicated by reference numeral 1105) a result value thereof. A virtual sensor 1107 may process the output 1105 of the sensor 1103 as an input. That is, the virtual sensor 1107 may output (indicated by reference numeral 1109) a result value of the virtual sensor through an additional processing based on the output 1105 of the sensor 1103. For example, when the actual sensor 1103 senses an operation by processing the input 1101, the operation sensing may be the output 1105. The virtual sensor 1107 may further process the output 1105 for sensing the operation and the position data to detect the presence or absence of a person. The detection of the presence of a person may be an output 1109 from the virtual sensor. In this case, a change may not occur in the process of the actual sensor 1103.

Figure 12:
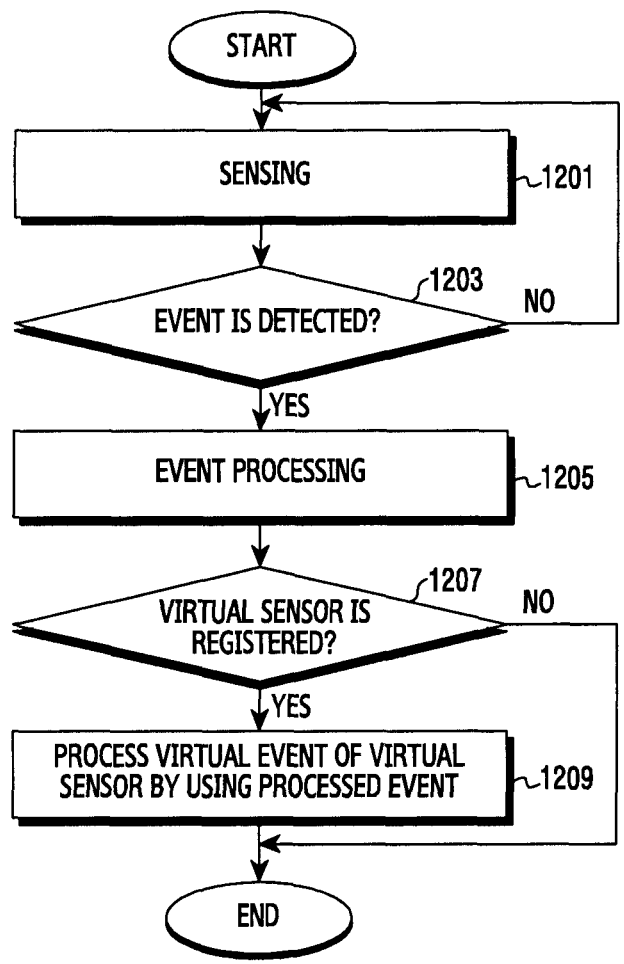
FIG. 12 is a flowchart illustrating a method for processing a virtual event using a virtual sensor according to various embodiments of the present disclosure.

FIG. 12 is a flowchart illustrating a method for processing a virtual event using a virtual sensor according to various embodiments of the present disclosure.

Referring now to FIG. 12, in operation 1201, a sensing operation may be performed by the electronic device 101 (e.g., the at least one processor 120). For example, the at least one processor 120 may receive sensing data from the sensor through the communication interface 170. The sensor may be a sensor registered in the electronic device 101 and be an actual sensor physically installed therein. The at least one processor 120 may receive, from the sensor, sensing data periodically or in real time. The at least one processor 120 may also receive information on the sensor while receiving the sensing data. For example, the at least one processor 120 may receive a sensor name or a sensor identifier with the sensing data so as to identify which sensor transmits the sensing data. On the other hand, the electronic device 101 may become a sensor itself or be capable of sensing by itself.

In operation 1203, according to an embodiment of the present disclosure, the at least one processor 120 may determine whether an event is detected. For example, the at least one processor 120 may receive sensing data including the fact that the event is detected from the sensor. On the other hand, the at least one processor 120 may determine whether the event is detected based on the sensing data. The at least one processor 120 may perform an operation 1205 when the event is detected, and the at least one processor 120 may return to an operation 1201 when the event is not detected.

In operation 1205, according to an embodiment of the present disclosure, the at least one processor 120 may perform an event processing. For example, the at least one processor 120 may process the detected event. The event processing may process the data of the event. The at least one processor 120 may process data of the event and perform the corresponding function (e.g., motion detection).

In operation 1207, according to an embodiment of the present disclosure, the at least one processor 120 may determine whether a virtual sensor is registered. For example, after the event processing, the at least one processor 120 may determine whether the virtual sensor is registered in order to determine whether an additional processing is required for the processed event. In order to process an event for the virtual sensor, the additional processing may be performed with respect to the processed event.

According to an embodiment of the present disclosure, when the virtual sensor is registered, the at least one processor 120 may perform an operation 1209, and when the virtual sensor is not registered, the at least one processor 120 may terminate the operation.

In operation 1209, according to an embodiment of the present disclosure, the at least one processor 120 may process the virtual event of the virtual sensor by using the processed event. For example, the at least one processor 120 may additionally perform data processing for the processed event to process the virtual event. For example, when the event is primarily processed, the motion can be detected, and when the primarily processed event is further secondarily processed, the presence or absence of a person can be determined. The at least one processor 120 may process the virtual event and perform the corresponding function (e.g., presence function).

Figure 13:
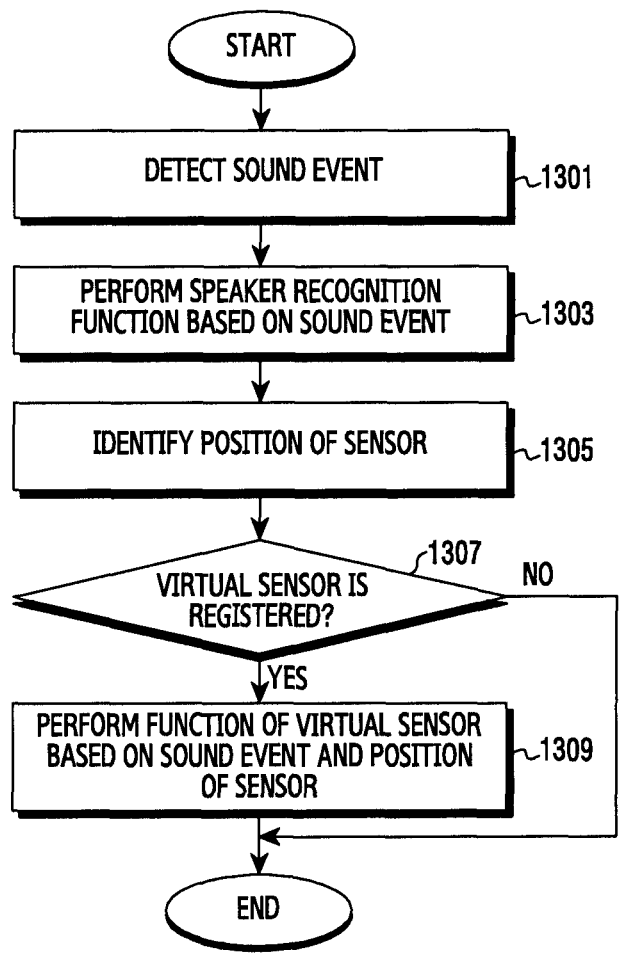
FIG. 13 is a flowchart illustrating a method for processing a virtual event using a microphone as a virtual sensor according to various embodiments of the present disclosure.

FIG. 13 is a flowchart illustrating a method for processing a virtual event using a microphone as a virtual sensor according to various embodiments of the present disclosure.

Referring now to FIG. 13, in operation 1301, the electronic device 101 (e.g., the at least one processor 120) may detect a sound event. For example, the sound event may be an event which can be detected when the microphone is installed as an actual sensor. For example, the at least one processor 120 may receive the sensing data from the microphone through the communication interface 170. The at least one processor 120 may detect a sound event on the basis of the sensing data. On the other hand, the at least one processor 120 may receive sensing data including the fact that the sound event is detected from the microphone through the communication interface 170. The at least one processor 120 may receive a name of the microphone or an identifier of the microphone with the sensing data so as to identify which microphone transmits the sensing data.

In operation 1303, according to an embodiment of the present disclosure, the at least one processor 120 may perform a speaker recognition function based on the sound event. For example, the at least one processor 120 may process the detected sound event and perform the speaker recognition function using a function corresponding thereto. When the voice of a person is detected as the sound event, the at least one processor 120 may identify who the speaker is, by comparing the voice of the detected person with pre-stored information. On the other hand, the at least one processor 120 may identify who the speaker is, by removing noise from the sound event and comparing the characteristics of the voice from which the noise has been removed with the characteristics of the pre-stored voice.

In operation 1305, according to an embodiment of the present disclosure, the at least one processor 120 may identify the position of the sensor. For example, when the microphone is registered in the electronic device 101, the at least one processor 120 may extract the position information stored therewith from the memory 130. The at least one processor 120 may retrieve, from the memory 130, position information that is matched to the name or identifier of the microphone received with the sensing data.

In operation 1307, according to an embodiment of the present disclosure, the at least one processor 120 may determine whether a virtual sensor is registered. For example, the at least one processor 120 may retrieve whether a sensor corresponding to the add-on function of the microphone is registered from the memory 130. The at least one processor 120 may retrieve whether there is a sensor which has the same information (e.g., model name) of the microphone but has different position information or functions from the memory 130.

According to an embodiment of the present disclosure, when the virtual sensor is registered, the at least one processor 120 may perform an operation 1309, and when the virtual sensor is not registered, the at least one processor 120 may terminate the operation.

In operation 1309, according to an embodiment of the present disclosure, the at least one processor 120 may perform a function of the virtual sensor based on a sound event and the position of a sensor. For example, when the voice of the person is detected as the sound event, the at least one processor 120 may identify that the person is present. In this case, the at least one processor 120 may turn ON the light installed at the position in which the sound event is detected. That is, the at least one processor 120 may perform an occupancy function as a function of the virtual sensor.

According to various embodiments of the present disclosure, when the at least one processor 120 may recognize the speaker, the at least one processor 120 may further sense the position of an individual user. When the magnitude of voice for the sound event is gradually increased or gradually decreased, through which the at least one processor 120 may utilize the virtual sensor as a proximity sensor.

According to an embodiment of the present disclosure, many Internet of Things (IoT) services such as IFTTT (If This Then That) are to make a basic rule based on general-purpose sensors in order to substitute for the difficulty of the user's rule setting and download the rule to perform an individually applied service. However, when trying to individually implement a service, all of the corresponding sensors have to be provided. When the corresponding sensors are not provided, it may occur that the corresponding services are not implemented. In the following, embodiments of the present disclosure that utilize the virtual sensor based on the rule will be described. For reference, IFTTT is a Web-based service and a program that helps the management of other software, such as Facebook, Gmail, Instagram, etc. through an instruction called "recipes".

Figure 14:
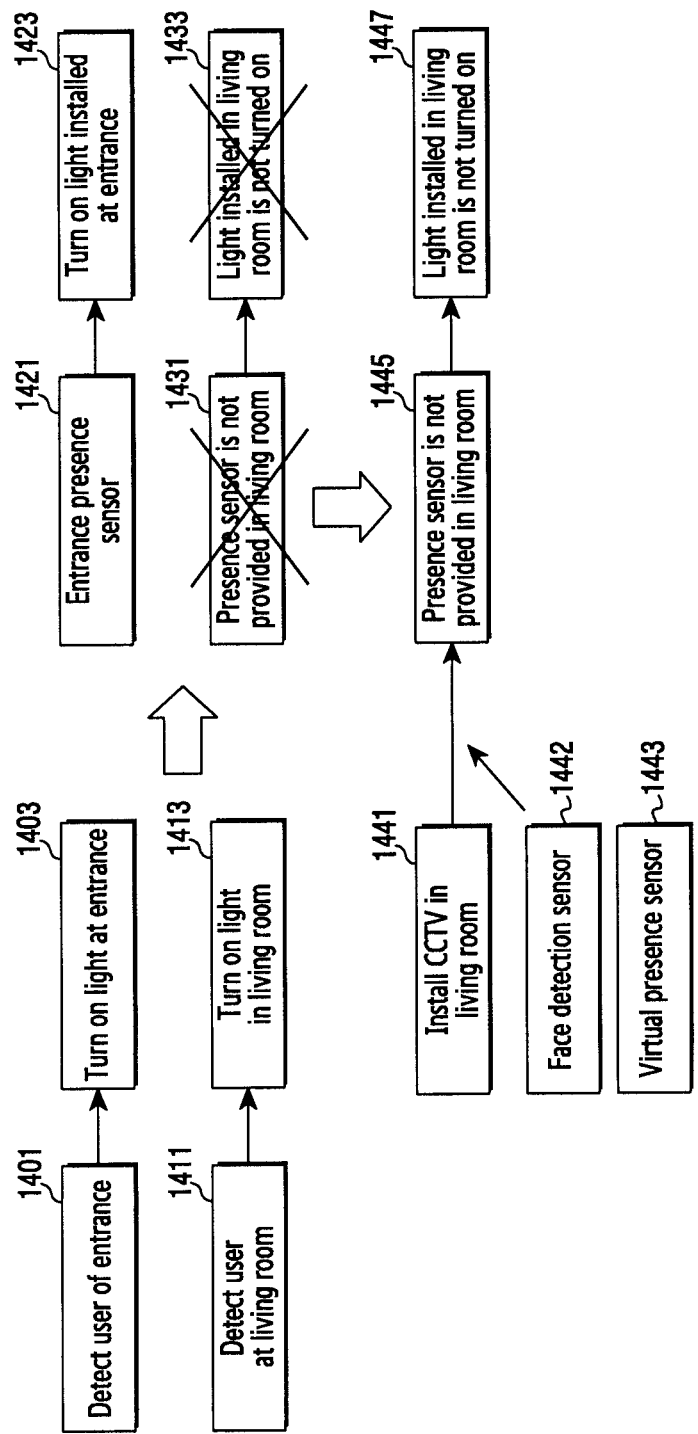
FIG. 14 is a configuration diagram of utilizing a virtual sensor, based on a rule according to various embodiments of the present disclosure.

FIG. 14 is a configuration diagram of utilizing a virtual sensor, based on a rule according to various embodiments of the present disclosure. Referring now to FIG. 14, the at least one processor 120 may utilize the most basic rule such that if 'A user is detected in front of the entrance', then 'Turn on the light at the entrance.' For example, the rule is such that the user is detected at the entrance (indicated by reference numeral 1401), then the light installed at the entrance (indicated by reference numeral 1403) is turned on. In addition, when the user is detected in the living room (indicated by reference numeral 1411, the light installed in the living room is turned on (indicated by reference numeral 1413). To this end, in the prior art, a presence sensor is installed at a particular position and the light might be turned on in a position at which the presence sensor is installed. That is, when the presence sensor is located at the entrance (indicated by reference numeral 1421), the light installed at the entrance may be turned on (indicated by reference numeral 1423).

According to various embodiments of the present disclosure, when the presence sensor is not provided in the living room 1431, a light installed in the living room may not be turned on (reference numeral 1433). According to an embodiment of the present disclosure, when a CCTV 1441 or a camera sensor of a robot is installed in the living room, the CCTV 1441 may be utilized as a virtual presence sensor 1443 as well as a face detection sensor 1442 corresponding to a main function of the CCTV. In this case, the light installed in the living room can be turned on (indicated by reference numeral 1447) by utilizing the CCTV 1441 as a living room presence sensor 1445.

Figure 15:
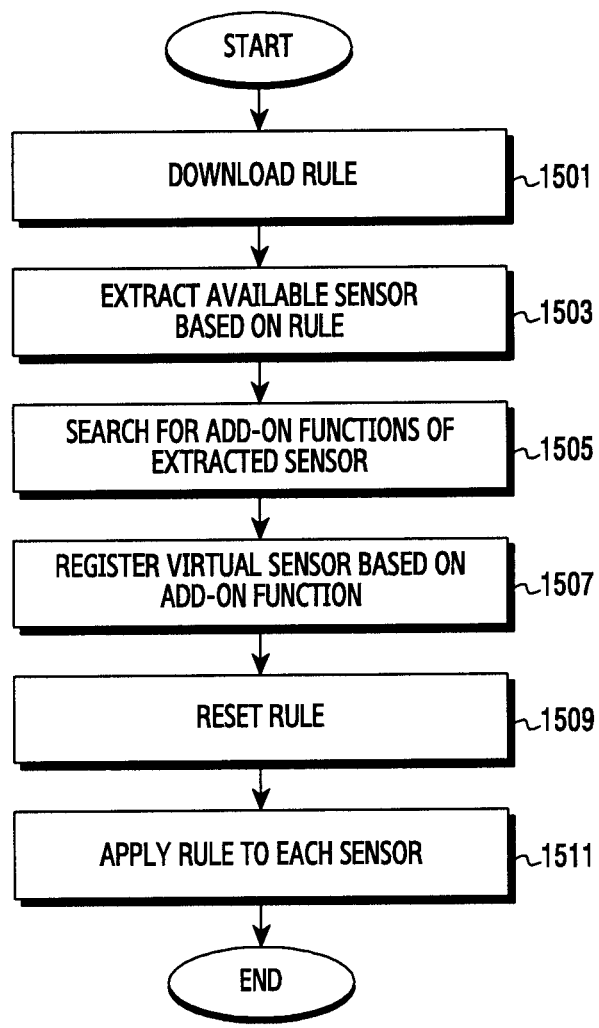
FIG. 15 is a flowchart illustrating a method for registering a virtual sensor, based on a rule according to various embodiments of the present disclosure.

FIG. 15 is a flowchart illustrating of method for registering a virtual sensor, based on a rule according to various embodiments of the present disclosure.

Referring now to FIG. 15, in operation 1501, the electronic device 101 (e.g., the at least one processor 120) may download a rule. The rule is associated with the event processing, for example, such that if 'A user is detected in front of the entrance', then 'Turn on the light at the entrance.', as described in FIG. 14.

In operation 1503, according to an embodiment of the present disclosure, the at least one processor 120 may extract information from an available sensor based on the rule. For example, the at least one processor 120 may detect whether there is a sensor capable of processing the rule such that if 'A user is detected in front of the entrance', then 'Turn on the light at the entrance'. The at least one processor 120 may extract the corresponding sensor based on the function of the sensor stored in the memory 130 and the rule.

In operation 1505, according to an embodiment of the present disclosure, the at least one processor 120 may search for add-on functions of the extracted sensor. The at least one processor 120 may search for add-on functions other than main functions among various functions of the extracted sensor. The add-on function search may be the same as or similar to the operation 1007 of FIG. 10.

In operation 1507, according to an embodiment of the present disclosure, the at least one processor 120 may register a virtual sensor based on the add-on function. The virtual sensor may mean that the actual sensor is used as a different virtual sensor, not a physically installed sensor (e.g., an actual sensor). The registration of the virtual sensor may be the same as or similar to the operation 1009 of FIG. 10. For example, the at least one processor 120 may register a CCTV installed in the living room as a virtual sensor, and when the movement is detected through the virtual sensor, the at least one processor 120 may register a function of processing the configured event as a function of the virtual sensor.

In operation 1509, according to an embodiment of the present disclosure, the at least one processor 120 may reset the rule. For example, when the user is detected in the living room, the at least one processor 120 may require a presence sensor in the living room in order to turn on the light installed in the living room. The at least one processor 120 may register a CCTV installed in the living room as the living room presence sensor so that when the motion is detected from the CCTV, the at least one processor 120 may set the rule of turning on the light installed in the living room.

In operation 1511, according to an embodiment of the present disclosure, the at least one processor 120 may apply the rule to each sensor. For example, the at least one processor 120 may register the CCTV as the living room virtual sensor, and when the motion is detected from the virtual sensor, the at least one processor 120 may apply the rule of turning on the light installed in the living room.

Figure 16:
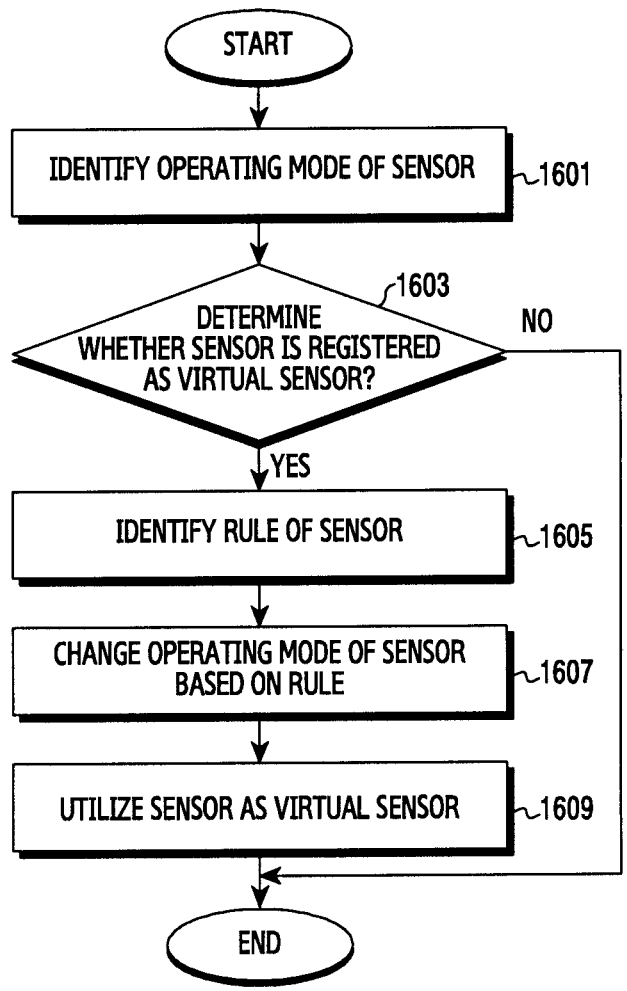
FIG. 16 is a flowchart illustrating a method for utilizing an actual sensor as a virtual sensor according to various embodiments of the present disclosure.

FIG. 16 is a flowchart illustrating a method for utilizing an actual sensor as a virtual sensor according to various embodiments of the present disclosure.

Referring now to FIG. 16, in operation 1601, the electronic device 101 (e.g., the at least one processor 120) may identify an operating mode of a sensor. Here, the operating mode of the sensor may mean an operating mode of an actual sensor. For example, the operating mode of the sensor may be at least one of operating time, operating conditions, or operating ranges.

In operation 1603, according to an embodiment of the present disclosure, the at least one processor 120 may determine whether a sensor is registered as a virtual sensor. For example, the at least one processor 120 may determine whether the virtual sensor performing different functions is stored in the memory 130, based on the information of the sensor.

According to an embodiment of the present disclosure, when the sensor is registered as a virtual sensor, the at least one processor 120 may perform an operation 1605, and when the sensor is not registered as a virtual sensor, the at least one processor 120 may terminate the operation.

In operation 1605, according to an embodiment of the present disclosure, the at least one processor 120 may identify a rule of the sensor. For example, the rule may be a rule of the actual sensor.

In operation 1607, according to an embodiment of the present disclosure, the at least one processor 120 may change an operating mode of a sensor based on the rule. For example, the at least one processor 120 may change the operating mode of the actual sensor such that the rule of the actual sensor and the rule of the virtual sensor are not overlapped with each other. For example, the actual sensor is not movable and configured to detect the motion at a first position (e.g., a kitchen) from 9 am to 10:00 pm. In this case, the at least one processor 120 may set the time from 10:01 pm to 8:59 am in the operating mode of the actual sensor as the operating time of the virtual sensor.

In operation 1609, the at least one processor 120 may use the sensor as a virtual sensor. For example, the at least one processor 120 may utilize the actual sensor as a virtual presence sensor, from 10:01 pm to 8:59 am.

Figure 17:
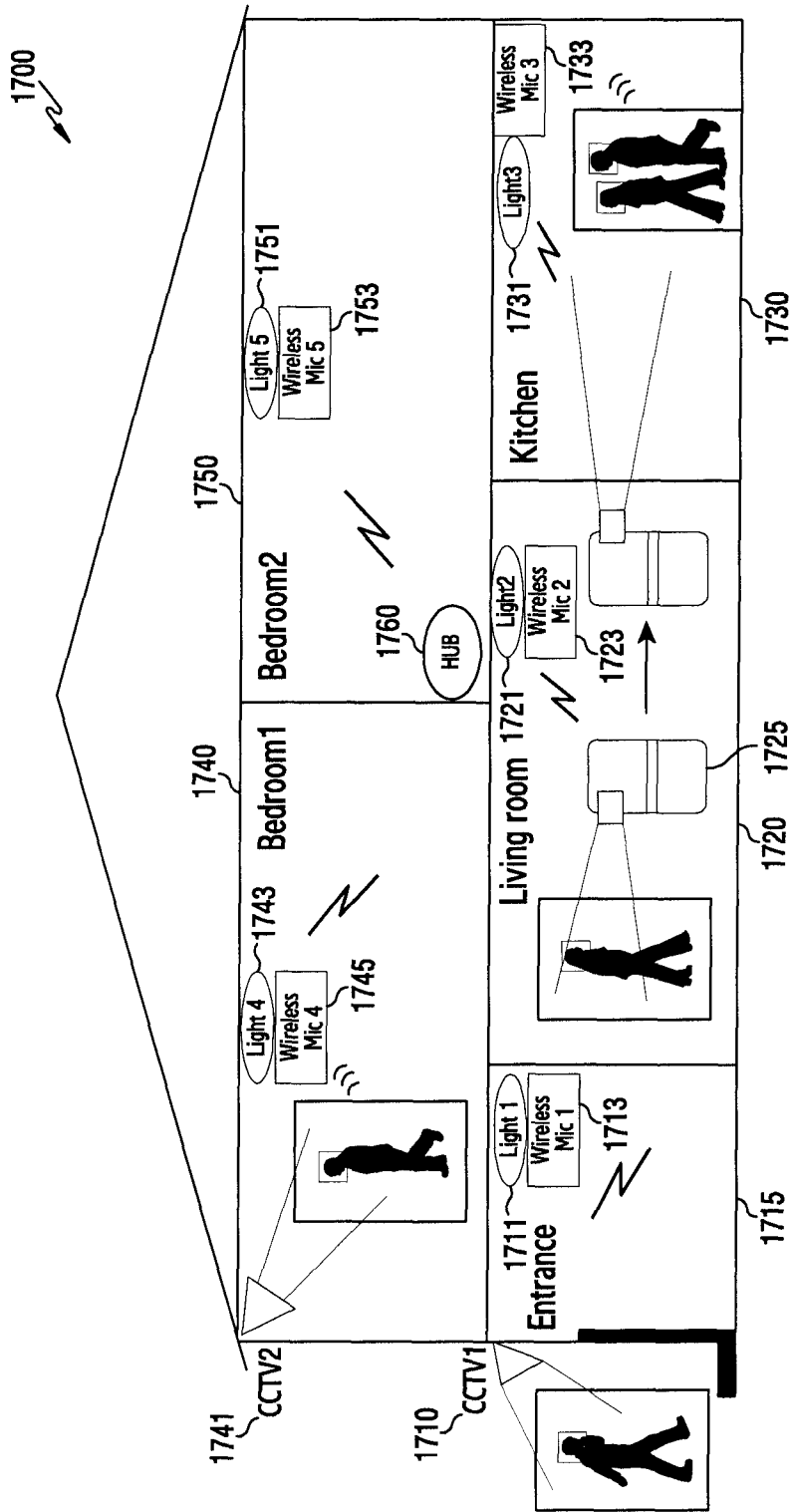
FIG. 17 is a diagram illustrating an implementing embodiment of utilizing a virtual sensor according to various embodiments of the present disclosure.

FIG. 17 is a diagram illustrating an implementing embodiment of utilizing a virtual sensor according to various embodiments of the present disclosure.

Referring now to FIG. 17, a smart home 1700 is provided with CCTVs 1710 and 1741, Lights 1711, 1721, 1731, 1743, and 1751, and wireless microphones 1713, 1723, 1733, 1745, and 1753, and a Hub 1760 may be established for managing the smart home. According to various embodiments of the present disclosure, the hub 1760 may be construed as the electronic device 101.

According to an embodiment of the present disclosure, the CCTV 1 1710 or the wireless microphone 1 1713 is installed at the entrance 1715, then it is possible to recognize a person approaching the entrance or the face of a person. The CCTV 1 1710 or the wireless microphone 1 1713 may also be set as an entrance access sensor (proximity sensor). That is, the CCTV 1 1710 may have a main function of face recognition and be utilized as a virtual sensor for sensing a person's approach. In addition, when secondarily recognizing the face of a person, the CCTV 1 1710 may also be configured as a user approach/introduction sensor. When sensing a person approaching the entrance 1715 using the CCTV 1 1710 or the wireless microphone 1 1713, the Hub 1760 may turn on the Light 11711.

According to an embodiment of the present disclosure, a robot camera sensor 1725 may be in the living room 1720 in the smart home 1700. In this case, for the conventional rule, when a person is present in the living room 1720, and when there is an instruction set of turning on a Light 2 1721, the robot camera sensor 1725 may be configured as a virtual presence sensor in advance. The robot camera sensor 1725 may turn on the Light 2 1721 by the rule within the hub 1760 or the robot camera sensor 1725 without processing a separate procedure. On the other hand, a wireless microphone 2 1723 is installed in the living room 1720 so that the wireless microphone 2 1723 may be utilized as a virtual presence sensor. When a voice is detected from the wireless microphone 2 1723, the hub 1760 may determine that a person is present and turn on the Light 2 1721 based on the rule.

According to an embodiment of the present disclosure, the robot camera sensor 1725 may be movable in the direction of living room 1720 or kitchen 1730. In addition, the wireless microphone 3 1733 may be installed in the kitchen 1730. Therefore, when there is a rule of turning on the Light 3 1731 if a person is in the kitchen 1730, two methods are available.

According to an embodiment of the present disclosure, firstly, the robot camera sensor 1725 installed in the living room 1720 is configured as a kitchen presence sensor, and on the basis of the configuration, the robot camera sensor 1725 may operate the driver of the camera sensor which has been sensed inside the living room 1720 and move a viewpoint of camera sensor in a direction of the kitchen 1730 so as to sense whether there is a person. A function of a sensor of which the conventional sensor does not have may be performed by using the movable function of the robot camera sensor 1725. Secondly, a user's voice or noise equal to or greater than a certain level may be sensed using the wireless microphone 3 1733 connected to the hub 1760 or the robot camera sensor 1725 to determine whether the user is present. When the wireless microphone 3 1733 detects the presence of a person, the hub 1760 or the robot camera sensor 1725 may turn on the Light 3 1731.

According to an embodiment of the present disclosure, when a wireless microphone 4 1745 is installed in a Bedroom1 1740 and the user's voice or noise equal to or greater than a certain level is sensed through the wireless microphone 4 1745, a Light 4 1743 may be turned on. In addition, when the CCTV 2 1741 is installed in the Bedroom 1 1740 and the user's presence as well as a human face recognition is detected, the Light 4 1743 may be turned on. That is, the CCTV 2 1741 may be used as an actual sensor for recognizing a human face and a virtual sensor for detecting the user's presence.

According to an embodiment of the present disclosure, when a wireless microphone 5 1753 is installed in a Bedroom2 1750 and the user's voice or a certain level or more of noise is sensed through the wireless microphone 5 1753, a Light 5 1751 may be turned on. Therefore, even though a presence sensor is not installed within the Smart Home 1770, the conventional sensor may be utilized as a virtual sensor by registering a similar function to the conventional sensor as the virtual sensor.

Figure 18:
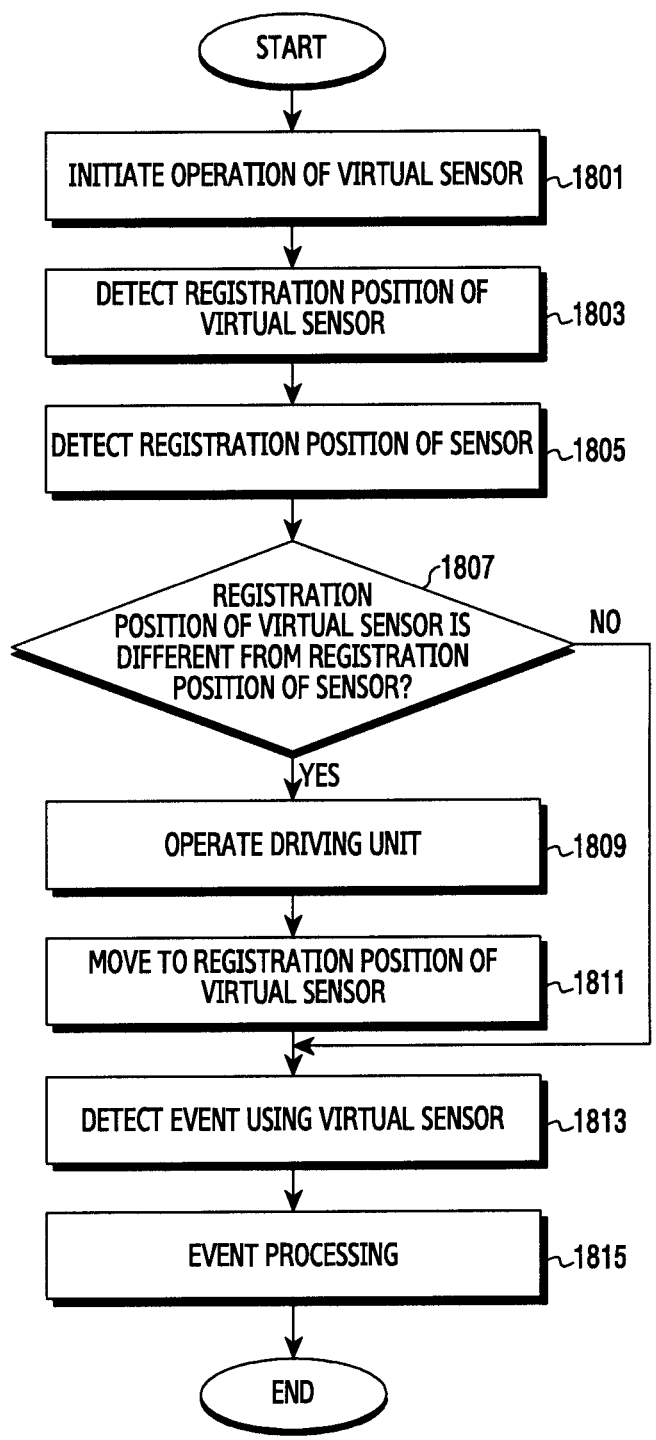
FIG. 18 is a flowchart illustrating a method for utilizing a virtual sensor using a driving unit according to various embodiments of the present disclosure.

FIG. 18 is a flowchart illustrating a method for utilizing a virtual sensor using a driver according to various embodiments of the present disclosure.

Referring now to FIG. 18, in operation 1801, the at least one processor 120 may initiate an operation of a virtual sensor. For example, the at least one processor 120 may determine that the operation of the virtual sensor is initiated in a case where sensing data is received from the virtual sensor or at the time when the virtual sensor operates.

In operation 1803, according to an embodiment of the present disclosure, the at least one processor 120 may detect the registration position of the virtual sensor. For example, the at least one processor 120 may search for the registration position of the virtual sensor stored in the memory 130. The registration position is construed as a position at which the virtual sensor senses data (e.g., sensing detection position).

In operation 1805, according to an embodiment of the present disclosure, the at least one processor 120 may detect the registration position of a sensor. For example, the registration position of the sensor may be a registration position of the actual sensor. The registration position of the sensor may be the same as or different from the registration position of the virtual sensor.

According to an embodiment of the present disclosure, in operation 1807, the at least one processor 120 may determine whether the registration position of the virtual sensor is different from the registration position of the sensor.

According to an embodiment of the present disclosure, when the registration positions of the virtual sensor and the sensor are different from each other, the at least one processor 120 may perform an operation 1809, and when the registration positions of the virtual sensor and the sensor are the same, the at least one processor 120 may perform an operation 1813.

According to an embodiment of the present disclosure, in operation 1809, the at least one processor 120 may operate the driver when the registration positions of the sensors are different from each other. For example, the electronic device 101 may include a movable driver 535 described in FIG. 5.

According to an embodiment of the present disclosure, in operation 1811, the at least one processor 120 may perform a function after moving to the registration position of the virtual sensor by the operation of the driver. For example, when the registration position of the sensor is a kitchen and the virtual sensor is located at the living room, the driver may move to the living room. For example, the at least one processor 120 is to perform an occupancy function using a virtual sensor, and when it is determined that the at least one processor does not determine whether the virtual sensor is present, the at least one processor 120 may move a viewpoint of the camera sensor towards the living room where the presence or absence of the virtual sensor can be detected, by moving the body of the robot by the operation of the driver of the robot.

According to an embodiment of the present disclosure, in operation 1813, the at least one processor 120 may detect an event using the virtual sensor. For example, the event may detect whether there is a person.

According to an embodiment of the present disclosure, in operation 1815, the at least one processor 120 may process the detected event. For example, when the presence of the person is detected, the at least one processor 120 may turn on the light installed at the registration location of the virtual sensor.

Figure 19:
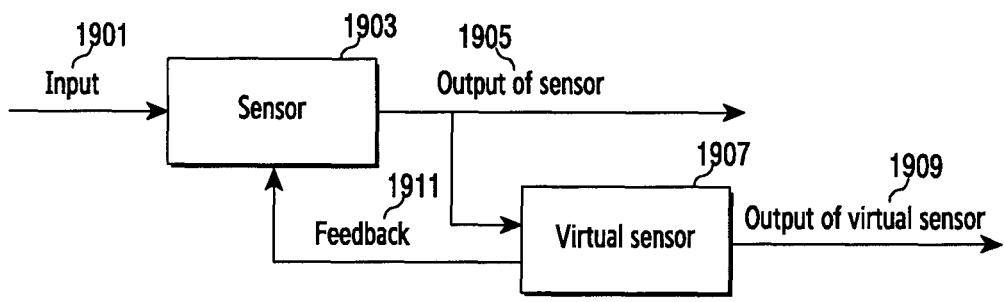
FIG. 19 is a diagram illustrating an example of implementing a low power mode of a virtual sensor according to various embodiments of the present disclosure.

FIG. 19 is a diagram illustrating an example of implementing a low power mode of a virtual sensor according to various embodiments of the present disclosure.

Referring now to FIG. 19, the sensor 1903 may process an input 1901 and output (indicated by reference numeral 1905) a result value thereof. A virtual sensor 1907 may process the output 1905 of the sensor 1903 as an input. That is, the virtual sensor 1907 may output (indicated by reference numeral 1909) a result value of the virtual sensor through an additional processing based on the output 1905 of the sensor 1903. In this case, the virtual sensor 1907 may not need all of the result values output from the sensor 1903.

For example, when only the virtual sensor 1907 is required to be operated, it may be operated by reducing the time or resolution of the sensor 1903 to the extent that is required to operate the virtual sensor 1907. For example, when the sensor 1903 performs face recognition or recording, it should maintain high resolution (e.g., color), however when the virtual sensor 1907 determines whether the user is present, the high resolution is not required. Therefore, the virtual sensor 1907 may feedback (indicated by reference numeral 1911) setting information (e.g., time or resolution) required for operating the sensor 1903. In this case, when only the virtual sensor 1907 operates, the sensor 1903 may be adjusted to a sensing cycle and a lower degree of resolution (e.g., black and white) capable of determining only whether the user is present. In this case, a low-power virtual sensor can be implemented. When the virtual sensor 1907 determines that a feedback step does not need to be added to a processing step to process information of the sensor 1903, the processing step of the sensor 1903 may be reduced.

According to various embodiments of the present disclosure, the sensor 1903 may provide the power (e.g., power-on) or may not provide the power (e.g., power-off) according to the operating time. For example, the operating time of the sensor 1903 may be 21:00~08:00, and the operating time of the virtual sensor 1907 may be 08:00~18:00. In this case, the sensor 1903 may not operate at 18:00~21:00. In this case, since the sensor 1903 may not operate as an original sensor or the virtual sensor 1907, the power of the sensor may be turned off. In this case, the power may be reduced as much as the amount of time during which the sensor 1903 is off.

Figure 20:
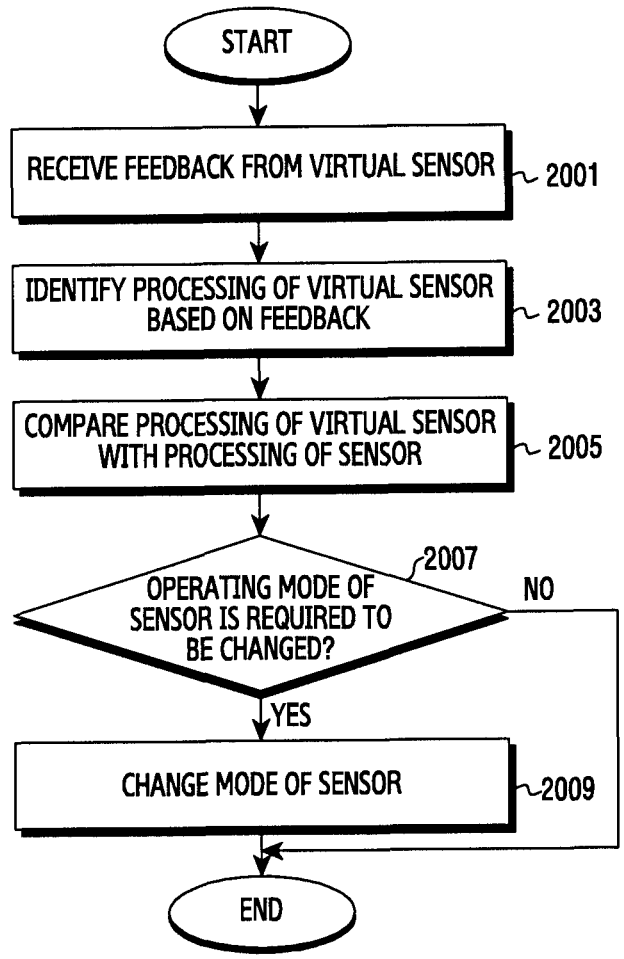
FIG. 20 is a flowchart illustrating a method for operating a low power mode of a virtual sensor according to various embodiments of the present disclosure.

FIG. 20 is a flowchart illustrating a method for operating a low power mode of a virtual sensor according to various embodiments of the present disclosure.

Referring now to FIG. 20, in operation 2001, the electronic device 101 (e.g., the at least one processor 120) may receive feedback from a virtual sensor. The feedback may include at least one of an operating time, operating function, or operating modes (e.g., resolution) of the virtual sensor.

According to an embodiment of the present disclosure, in operation 2003, the at least one processor 120 may identify a processing of the virtual sensor based on the feedback. The processing of the virtual sensor may be information or an operating mode required for data processing.

According to an embodiment of the present disclosure, in operation 2005, the at least one processor 120 may compare a processing of the virtual sensor with a processing of the sensor. For example, the at least one processor 120 may compare information required for the data processing of the virtual sensor with information (e.g., time and resolution) required for the data processing of the sensor.

According to an embodiment of the present disclosure, in operation 2007, the at least one processor 120 may determine whether the operating mode of the sensor is required to be changed, based on a result of the comparison.

According to an embodiment of the present disclosure, when the operating mode of the sensor is required to be changed, the at least one processor 120 may perform an operation 2009, and when the operating mode change of the sensor is not required, the at least one processor 120 may terminate the operation.

According to an embodiment of the present disclosure, in operation 2009, the at least one processor 120 may change the mode of a sensor. For example, when it is determined that the sensor processing step, or driving setting value of the sensor, for example, the resolution, driving time, or image processing analysis level are not necessary to perform a virtual sensor processing, the processing step, processing time or setting value of the sensor may be changed to a lower level and then processed. Accordingly, operating steps of the sensor and the consumption current of the sensor can be reduced.

Figure 21:
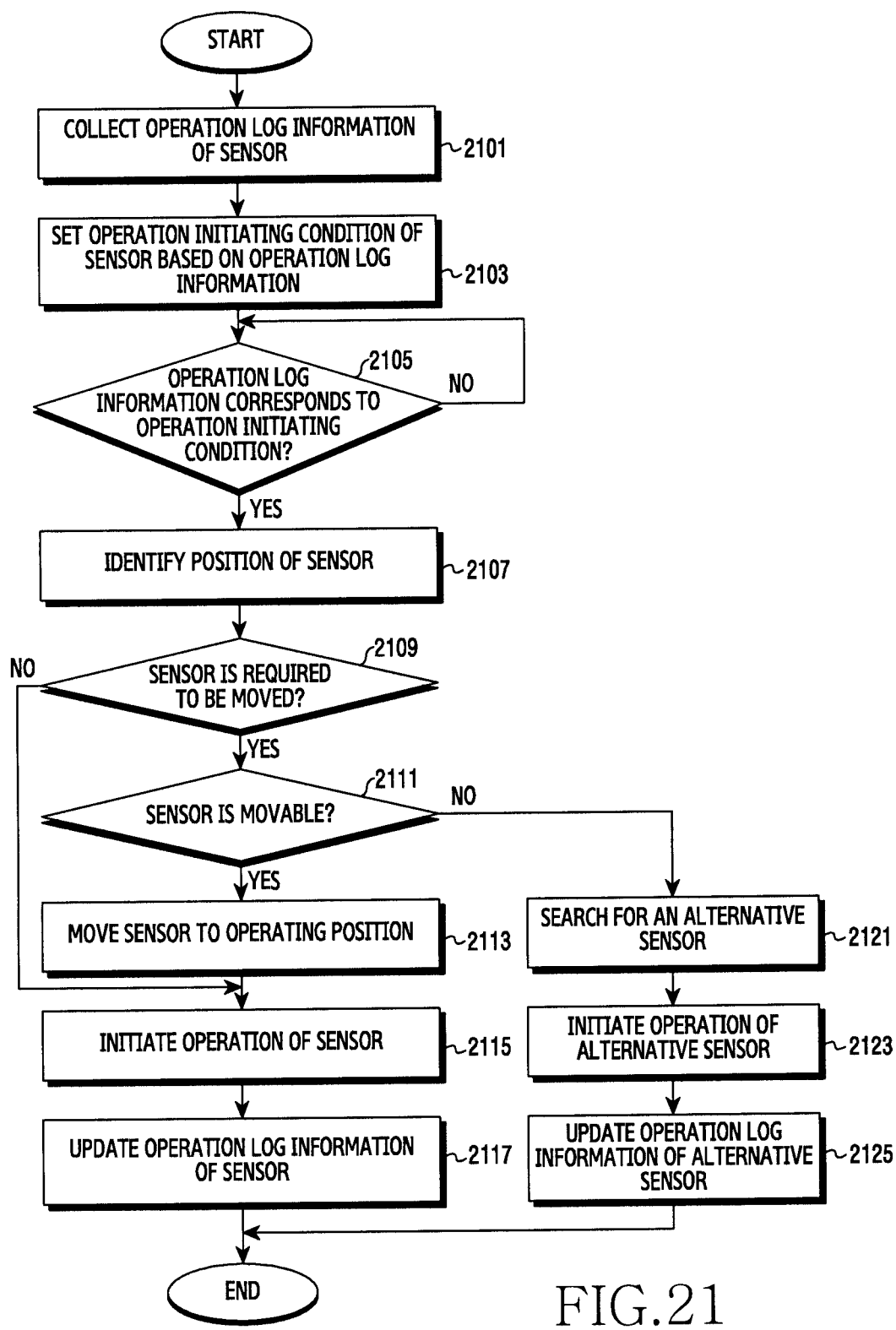
FIG. 21 is a flowchart illustrating an operating method of moving a sensor position according to various embodiments of the present disclosure.

FIG. 21 is a flowchart illustrating an operation method of moving a sensor position according to various embodiments of the present disclosure.

Referring now to FIG. 21, in operation 2101, the electronic device 101 (e.g., the at least one processor 120) may collect operation log information of a sensor. In this case, the sensor may be an actual sensor or a virtual sensor. The operation log information may be operation information of the sensor collected during the selected period (e.g., 1 day, 7 days, 15 days, etc.). For example, the operation log information may include at least one of an operating time related to a sensor, an event detection frequency, an event detected position, or an event detected record before operating as the virtual sensor.

According to an embodiment of the present disclosure, in operation 2103, the at least one processor 120 may set the operation initiating condition of the sensor based on the operation log information. For example, the at least one processor 120 may set the operation initiating condition including at least one of the operating time of the sensor, operating position thereof, event types to be detected, operating conditions, or whether the sensor moves, on the basis of the operation log information. The setting of the operation initiating condition of the sensor based on the operation log information may correspond to operate the sensor in an optimum operating position at which the event is easily detected. According to various embodiments of the present disclosure, the at least one processor 120 may set, based on the operation log information, the operation initiating condition that includes at least one of an estimated time to event occurrence (e.g., operating time), a position at which an event is detected (e.g., operating position), detected event types, or event-processing method.

According to an embodiment of the present disclosure, in operation 2105, the at least one processor 120 may determine whether the operation log information corresponds to the operation initiating condition. For example, when the sensor is provided in the house, and the operation initiating condition corresponds to 20:00~06:00, then a sensor detects whether an event occurs in the room 1, and when the operation initiating condition corresponds to 06:00, the sensor detects whether an event occurs in the living room. The at least one processor 120 may determine whether current time is equal to the operating time. On the other hand, the at least one processor 120 may determine whether the current time is a predetermined time prior (e.g., 5 minutes before) to the operating time.

According to an embodiment of the present disclosure, in operation 2107, the at least one processor 120 may identify a position of the sensor. For example, the at least one processor 120 may determine whether the current sensor is located at a position in which the sensor is to be detected during the operating time. For example, the at least one processor 120 may identify in advance the current position of the sensor at 05:55, five minutes to 6:00.

According to an embodiment of the present disclosure, in operation 2109, the at least one processor 120 may determine whether the sensor is required to be moved. For example, since the operation initiating condition is to detect whether an event occurs in the "living room" at 6:00, the at least one processor 120 may determine that the sensor is required to be moved when the sensor is located at "room 1" at 05:55.

According to an embodiment of the present disclosure, when the sensor is required to be moved, the at least one processor 120 may perform an operation 2111, and when the sensor is not be required to be moved, the at least one processor 120 may perform an operation 2115.

According to an embodiment of the present disclosure, in operation 2111, the at least one processor 120 may determine whether the sensor is movable. For example, the electronic device 101 may include the sensor and the driver 535 and move the sensor (e.g., electronic device 101) by driving the driver 535.

According to an embodiment of the present disclosure, when the sensor is movable, the at least one processor 120 may perform an operation 2113, and when the sensor is not movable, the at least one processor 120 may perform an operation 2121.

According to an embodiment of the present disclosure, in operation 2113, the at least one processor 120 may move the sensor to an operating position. In operation 2115, the at least one processor 120 may initiate an operation of the sensor. The sensor may detect an event. In operation 2117, the at least one processor 120 may update the operation log information of the sensor. The operation log information may include information on whether an event is detected and the position is moved, or the position at which the event is detected, through the operation 2115. The at least one processor 120 may perform the operation 2113 and operation 2115 and update a result of the performance as operation log information. Since the operation log information includes information on whether the event is detected, the at least one processor 120 may reset the operation initiating condition based on whether the event is detected. The at least one processor 120 may perform the operation 2113 and operation 2115, and when the event is not detected, the at least one processor 120 may register the position at which the operation 2113 and operation 2115 are performed as an operation avoidance point. On the other hand, the at least one processor 120 may register the time at which the operation 2113 and operation 2115 are performed as an operation avoidance time.

According to an embodiment of the present disclosure, when the sensor is not movable, in operation 2121, the at least one processor 120 may search for an alternative sensor. The alternative sensor may refer to a different sensor rather than the sensor set in the operation initiating condition. For example, when the sensor set in the initial operating condition is a camera sensor, the alternative sensor may be a microphone input sensor or a door lock sensor. The alternative sensor may be at least one of sensors registered in the electronic device 101.

According to an embodiment of the present disclosure, in operation 2123, the at least one processor 120 may initiate an operation of the alternative sensor. The alternative sensor may detect an event. In operation 2125, the at least one processor 120 may update the operation log information of the alternative sensor. The operation log information may include information on whether an event is detected and the position at which the event is detected through the operation 2123. The at least one processor 120 may perform the operation 2123 and update a result of the performance as operation log information. Since the operation log information includes information on whether the event is detected, the at least one processor 120 may reset the operating time, operating position, and the like based on whether the event is detected. The at least one processor 120 may perform the operation 2123, and when the event is not detected, the at least one processor 120 may register the position at which the operation 2123 is performed as an operation avoidance point. On the other hand, the at least one processor 120 may register the time at which the operation 2123 is performed as an operation avoidance time.

Figure 22:
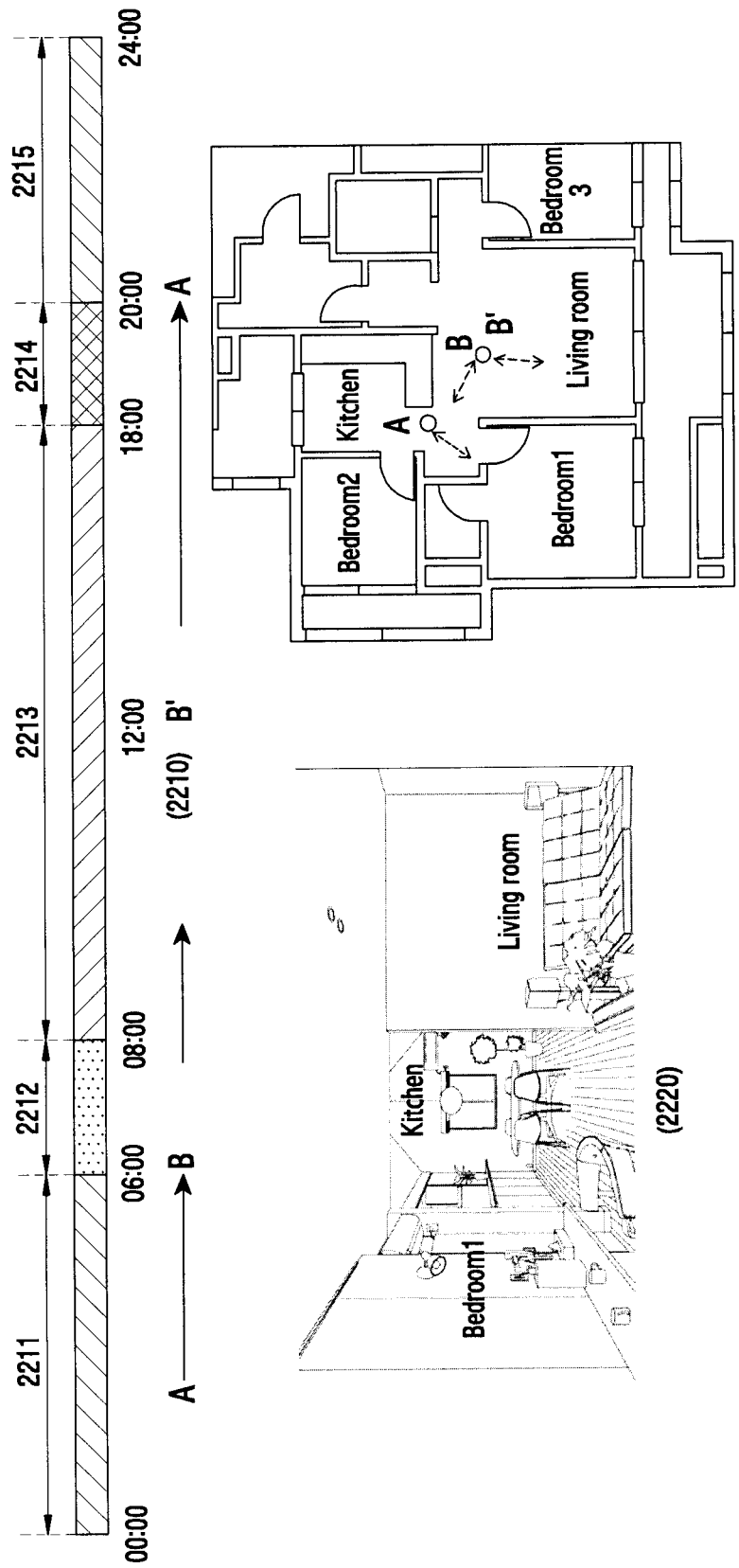
FIG. 22 is a diagram illustrating an example of the movement of a sensor position and detection thereof based on time according to various embodiments of the present disclosure.

FIG. 22 is a diagram illustrating an example of the movement of a sensor position and detection thereof based on time according to various embodiments of the present disclosure.

According to an embodiment of the present disclosure, FIG. 22 illustrates an example of moving the position of a sensor and detecting an event in a case where the sensor is registered and used in the house. Referring to FIG. 22, reference numeral 2220 is a three dimensional diagram of the house, and reference numeral 2230 may be a plan view of the house. Reference numeral 2210 shows an example of driving the sensor by moving the position of the sensor based on time. Referring to reference numeral 2210, the at least one processor 120 may set an operating time of a sensor for each position such that the sensor detects whether an event occurs in a room 1A during the time of 00:00~06:00 (indicated by reference numeral 2211) and detects whether an event occurs in the room 1A and kitchen B during the time of 06:00~08:00 (indicated by reference numeral 2212). In this case, the at least one processor 120 may move the sensor from the room 1A to the kitchen B prior to 6:00 to prepare for the detection of the event in the kitchen in advance. The sensor may detect all of the events of the room 1 and kitchen by going around the room 1 and the kitchen during the time of 6:00 to 8:00 (indicated by reference numeral 2212).

According to an embodiment of the present disclosure, the at least one processor 120 may set the operating time of a sensor such that the sensor detects whether an event has occurred in the living room B' during the time of 08:00~18:00 (indicated by reference numeral 2213), detects whether an event has occurred in the room 1A and a living room B' during the time of 18:00~20:00 (indicated by reference numeral 2214), and detects whether an event has occurred in the room 1A during the time of 20:00 to 24:00 (indicated by reference numeral 2215). The at least one processor 120 moves a sensor from the living room to room 1 prior to 18:00 to prepare for the detection of the event in the room 1 in advance. The sensor may detect all of the events of room 1 and living room by going around the room 1 and living room during the time of 18:00 to 20:00 (indicated by reference numeral 2214).

Figure 23:
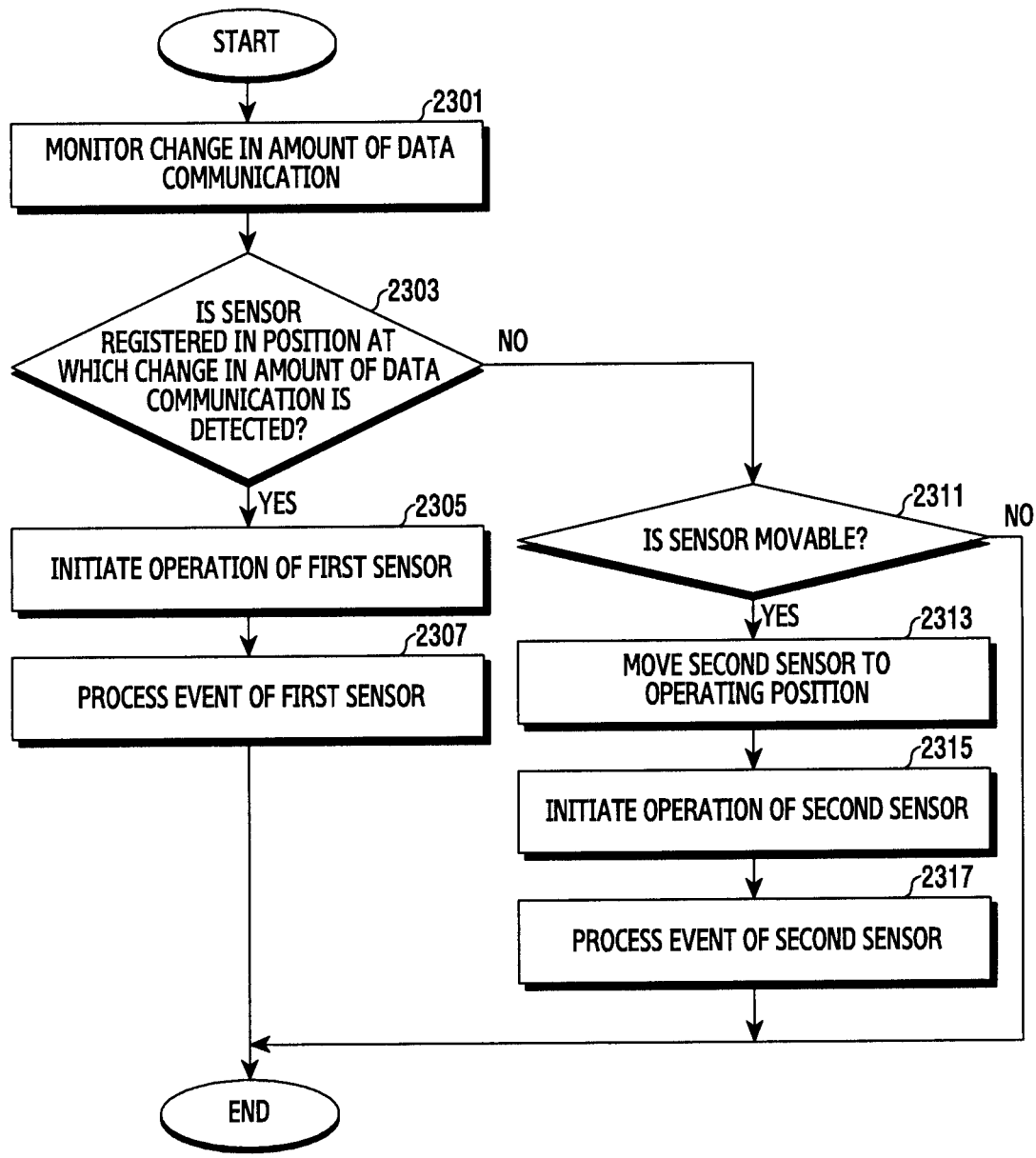
FIG. 23 is a flowchart illustrating a method for operating a sensor using a communication module according to various embodiments of the present disclosure.

FIG. 23 is a flowchart illustrating a method for operating a sensor using a communication module according to various embodiments of the present disclosure.

Referring now to FIG. 23, in operation 2301, the electronic device 101 (e.g., the at least one processor 120) may monitor a change in the amount of data communication. The electronic device 101 may include a communication sensor (e.g., an ultra-wide band sensor and a Wi-Fi circuit) which functions like an access Point (AP). In this case, peripheral electronic devices may perform wireless communication through the electronic device 101, and the at least one processor 120 may monitor the amount of data the peripheral electronic devices communicate through the AP. The change in the amount of data communication may be a change in the amount of data when the peripheral electronic devices perform wireless communication through the electronic device 101.

In operation 2303, according to an embodiment of the present disclosure, the at least one processor 120 may determine whether there is a sensor registered in a position at which the change in the amount of data communication is detected. For example, when the change in the amount of data communication is suddenly increased, the at least one processor 120 may determine whether there is a peripheral electronic device and a user who uses the peripheral electronic device. For example, when there is a change in the amount of data communication or the change in the amount of data communication is suddenly increased, the at least one processor 120 may determine that a person is present. The at least one processor 120 may determine whether there is a different sensor except a communication sensor which monitors the change in the amount of data at the position at which the change in the amount of data communication is detected.

According to an embodiment of the present disclosure, when there is a sensor registered at the position, the at least one processor 120 may perform an operation 2305, and when there is no sensor registered at the position, the at least one processor 120 may perform an operation 2311.

According to an embodiment of the present disclosure, in operation 2305, the at least one processor 120 may initiate an operation of a first sensor. The first sensor may be a sensor different from the communication sensor, and may be a different sensor located in the point where the communication sensor is located. The first sensor may include an actual sensor or a virtual sensor. In operation 2307, the at least one processor 120 may process an event of the first sensor. For example, when an event (e.g., operation sensing) occurs, the first sensor may process the event as an input and output a result value thereof. When the operation is sensed, the first sensor may turn on the light installed at the position.

According to an embodiment of the present disclosure, when there is no sensor registered in the position, in operation 2311, the at least one processor 120 may determine whether there is a movable sensor. Since there is no sensor registered in the position, the at least one processor 120 may determine whether there is a movable sensor in order to process an event at the position using the movable sensor.

According to an embodiment of the present disclosure, when there is a movable sensor, the at least one processor 120 may perform an operation 2313, and when the there is no movable sensor, the at least one processor 120 may terminate the operation.

According to an embodiment of the present disclosure, when there is a movable sensor, in operation 2313, the at least one processor 120 may move a second sensor to an operating position (e.g., the operating position of the communication sensor). The second sensor is a moveable sensor and may be the same as or different from the first sensor. The at least one processor 120 may move the second sensor to the position in order to process the event at the position. For example, the electronic device 101 may include the sensor and the driver 535 and move the operating position of the second sensor (e.g., the electronic device 101) by driving the driver 535.

According to an embodiment of the present disclosure, in operation 2315, the at least one processor 120 may initiate an operation of the second sensor. The second sensor may include an actual sensor or a virtual sensor. In operation 2317, the at least one processor 120 may process an event of the second sensor. For example, when the event (e.g., operation sensing) occurs, the second sensor may process the event as an input and output a result value thereof. When the operation is sensed, the second sensor may turn on a TV installed at the position.

Figure 24:
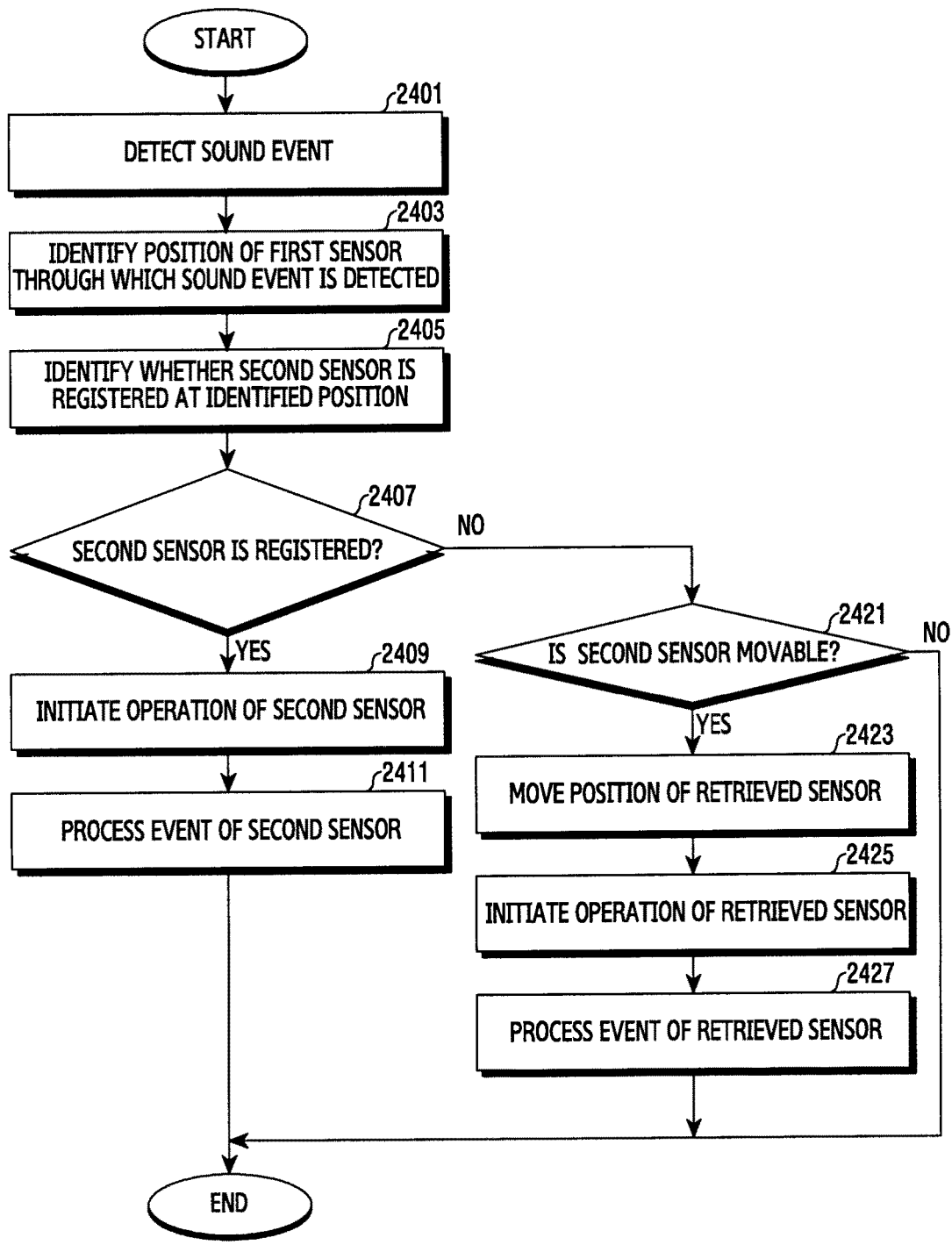
FIG. 24 is a flowchart showing a method for sequentially operating various sensors according to various embodiments of the present disclosure.

FIG. 24 is a flowchart showing a method for sequentially operating various sensors according to various embodiments of the present disclosure.

Referring now to FIG. 24, in operation 2401, the electronic device 101 (e.g., the at least one processor 120) may detect a sound event. For example, the sound event may be an event which can be detected when the microphone is installed. For example, the at least one processor 120 may receive sensing data from the microphone through the communication interface 170. The at least one processor 120 may detect a sound event on the basis of the sensing data. On the other hand, the at least one processor 120 may receive sensing data including the fact that the sound event is detected from the microphone through the communication interface 170. The at least one processor 120 may receive a name of the microphone or an identifier of the microphone with the sensing data so as to identify which microphone transmits the sensing data.

According to an embodiment of the present disclosure, in operation 2403, the at least one processor 120 may identify the position of a first sensor through which a sound event is detected. For example, when the microphone is registered in the electronic device 101, the at least one processor 120 may extract from the memory 130 the position information stored therewith. The at least one processor 120 may retrieve, from the memory 130, position information that is matched to the name or identifier of the first sensor received with the sensing data.

According to an embodiment of the present disclosure, in operation 2407, the at least one processor 120 may determine whether a second sensor is registered. For example, the at least one processor 120 may retrieve whether a second sensor corresponding to the add-on function of the first sensor is registered in the memory 130. The at least one processor 120 may retrieve whether there is a sensor which has the same information (e.g., model name) of the microphone but has different position information or functions from the memory 130.

According to an embodiment of the present disclosure, when the second sensor is registered, the at least one processor 120 may perform an operation 2409, and when the second sensor is not registered, the at least one processor 120 may perform an operation 2421.

According to an embodiment of the present disclosure, in operation 2409, the at least one processor 120 may initiate an operation of the second sensor. For example, when the voice of a person is detected as the sound event, the at least one processor 120 may identify that a person is present. In this case, the at least one processor 120 may monitor a change in the amount of data of a communication sensor (e.g., an ultra-wide band sensor and a Wi-Fi circuit) through which the sound event is detected.

According to an embodiment of the present disclosure, in operation 2411, the at least one processor 120 may process an event of the second sensor. For example, when a change in the amount of data is detected through the communication sensor, the at least one processor may turn on the light installed at the position at which the second sensor is located.

According to an embodiment of the present disclosure, when there is no sensor registered in the position, the at least one processor 120 may determine whether there is a movable sensor in operation 2421. Since the second sensor is not registered, the at least one processor 120 may retrieve whether there is a movable sensor in order to process the event at the position of the first sensor by using the movable sensor.

According to an embodiment of the present disclosure, when the movable sensor is retrieved, the at least one processor 120 may perform an operation 2423, and when the movable sensor is not retrieved, the at least one processor 120 may terminate the operation.

According to an embodiment of the present disclosure, in operation 2423, the at least one processor 120 may move the sensor to a position at which the sensor is retrieved (e.g., an operating position of the first sensor). The retrieved sensor is a movable sensor and may be the same as or different from the second sensor. The at least one processor 120 may move the retrieved sensor to the position in order to process the event at the position. For example, the electronic device 101 may include the sensor and the driver 535, and move the operating position of the retrieved sensor (e.g., the electronic device 101) by driving the driver 535.

According to an embodiment of the present disclosure, in operation 2425, the at least one processor 120 may initiate an operation of the retrieved sensor. The retrieved sensor may include an actual sensor or a virtual sensor. In operation 2327, the at least one processor 120 may process an event of the retrieved sensor. For example, when the event (e.g., operation sensing) occurs, the retrieved sensor may process the event as an input and output a result value thereof. When the operation is sensed, the retrieved sensor may turn on a TV installed at the position.

An operating method of an electronic device according to various embodiments of the present disclosure may include: driving the at least one sensor which is provided as a user interface of the electronic device; driving the at least one sensor provided as a sensing device for detecting the movement or sound of an object in a selected range or space to provide data based on at least some of the detected movement or sound; transmitting at least some portions of data to an external device by using the communication circuit; and internally processing the at least some portions of data.

The transmitting of at least some portions of data with an external device may include: determining that the movement or sound of an object in the selected range or space is detected; and transmitting a signal indicating that the movement or sound is detected to the external device by using the communication circuit.

The driving of the at least one sensor may include: driving the at least one sensor provided as a sensing device during a selected period of time or when the selected condition is satisfied.

The at least one sensor may include at least one of an image sensor, a microphone, an ultra-wide band sensor, or a Wi-Fi circuit.

The operating method may further include: moving or locating the electronic device to a selected viewpoint for detecting the movement or the sound in the selected position or selected range or space, by controlling the driver for moving the electronic device.

The operating method may further include: registering the at least one sensor as a virtual sensor based on the position of the at least one sensor and an add-on function of the at least one sensor; processing an event based on data sensed through the virtual sensor; and processing a virtual event of the virtual sensor by using the processed event.

The operating method may further include: extracting a sensor which can be used as a virtual sensor of the at least one sensor, based on a rule; searching for an add-on function of the extracted sensor; registering the extracted sensor as a virtual sensor by using the retrieved add-on function; and resetting the rule to apply the rule to the at least one sensor and the virtual sensor.

The operating method may further include: when the registration position of the at least one sensor is different from the operating position thereof, driving the driver to move the sensor to the operating position.

The operating method may further include: receiving feedback from the at least one sensor; and determining a change in an operating mode of the at least one sensor based on the feedback.

The determining of the change in the operating mode may include: identifying the processing of the at least one sensor based on the feedback; and when the processing of the at least one sensor and the processing of a virtual sensor associated with the at least one sensor are different from each other, changing an operating mode of the at least one sensor.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as by at least one processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry, such as integrated circuitry, that is configured for operation. Under the broadest reasonable interpretation, the appended claims constitute statutory subject matter in compliance with 35 U.S.C. § 101 and none of the elements are software per se.

Nor are the claims directed to Abstract ideas.

The definition of the terms "unit" or "module" as referred to herein are to be understood as constituting hardware circuitry such as a CCD, CMOS, SoC, AISC, FPGA, at least one processor or microprocessor (e.g. a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

A computer-readable recording medium according to various embodiments of the present disclosure may record a program for executing operations, the operations including: driving the at least one sensor which is provided as a user interface of the electronic device; driving the at least one sensor provided as a sensing device for detecting the movement or sound of an object in a selected range or space to provide data based on at least some of the detected movement or sound; communicating with an external device including transmitting at least a portion of data to an external device via the communication circuit; and internally processing at least another portion of data.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added. Various embodiments of the present disclosure discussed herein are provided merely to easily describe technical details of the present disclosure and to help the understanding of the present disclosure, and do not limit the scope of the present disclosure of the appended claims to only what is shown and described herein. Therefore, a person of ordinary skill in the art understand and appreciates that modifications and changes or modified and changed forms based on the technical idea of the present disclosure fall within the scope of the present disclosure and the appended claims.

What is claimed is:

1. An electronic device located in an indoor space partitioned into a plurality of areas, the electronic device comprising:
   a communication circuit;
   a memory storing instructions; and
   a processor configured to execute the stored instructions to:
   receive, by the communication circuit, data transmitted through a communication device from an external device;
   after receiving the data, receive, by the communication circuit, another data transmitted through the communication device from the external device;
   determine, based at least on the data or the other data, a position of the external device;
   identify that size of the other data is different from size of the data;
   in response to the identification, transmit, through the communication device to another external device identified based on the position of the external device, a signal for requesting to turn on a light bulb;
   after receiving the data, identify that information of a function of the external device is registered in the memory;
   in response to the identification that the information of the function of the external device is registered in the memory, transmit, through the communication device to the external device, a signal for requesting to transmit, to the electronic device, the other data corresponding to the function;
   in response to the identification that the information of the function of the external device is not registered in the memory, identify an external movable device different from the external device and the other external device;
   in response to the identification of the external movable device, transmit, through the communication device to the external movable device, a signal for requesting to move to a first position;
   after the external movable device being located on the first position, receive, by the communication circuit, additional data transmitted through the communication device from the external movable device, the additional data corresponding to the function;
   identify that size of the additional data from the external movable device is different from the size of the data from the external device;
   in response to the identification that the size of the additional data from the external movable device is different from the size of the data from the external device, transmit, through the communication device to the other external device, the signal for requesting to turn on the light bulb; and
   identify the external movable device different from the external device and the other external device, based on operation log information which is stored in the memory.

2. The electronic device of claim 1, wherein the data is data corresponding to a first function of the external device; and
   wherein the other data is data corresponding to a second function of the external device.

3. The electronic device of claim 1,
   wherein the function corresponds a recognition of presence of a user.

4. The electronic device of claim 1, wherein the external device is at least one of an image sensor, or a microphone.

5. The electronic device of claim 1, wherein the other data from the external device indicates a level of noise.

6. An operating method of an electronic device located in an indoor space partitioned into a plurality of areas, the method comprising:
   receiving, by a communication circuit, data transmitted through a communication device from an external device;
   after receiving the data, receiving, by the communication circuit, another data transmitted through the communication device from the external device;
   determining, based at least on the data or the other data, a position of the external device;
   identifying that size of the other data is different from size of the data;
   in response to the identification, transmitting, through the communication device to another external device identified based on the position of the external device, a signal for requesting to turn on a light bulb;
   after receiving the data, identifying that information of a function of the external device is registered in a memory;
   in response to the identification that the information of the function of the external device is registered in the memory, transmitting, through the communication device to the external device, a signal for requesting to transmit, to the electronic device, the other data corresponding to the function;

in response to the identification that the information of the function of the external device is not registered in the memory, identifying an external movable device different from the external device and the other external device;

in response to the identification of the external movable device, transmitting, through the communication device to the external movable device, a signal for requesting to move to a first position;

after the external movable device being located on the first position, receiving, by the communication circuit, additional data transmitted through the communication device from the external movable device, the additional data corresponding to the function;

identifying that size of the other data from the external movable device is different from the size of the data from the external device;

in response to the identification that the size of the other data from the external movable device is different from the size of the data from the external device, transmitting, through the communication device to the other external device, the signal for requesting to turn on the light bulb; and identifying the external movable device different from the external device and the other external device, based on operation log information which is stored in the memory.

7. The method of claim 6, wherein the data is data corresponding to a first function of the external device; and wherein the other data is data corresponding to a second function of the external device.

8. The method of claim 6, wherein the function corresponds a recognition of presence of a user.

9. The method of claim 6, wherein the external device is at least one of an image sensor, or a microphone.

10. The method of claim 6, wherein the other data from the external device indicates a level of noise.

* * * * *